United States Patent
Coffey

(10) Patent No.: US 9,742,704 B2
(45) Date of Patent: *Aug. 22, 2017

(54) PHYSICAL LAYER MANAGEMENT AT A WALL PLATE DEVICE

(71) Applicant: CommScope Technologies LLC, Hickory, NC (US)

(72) Inventor: Joseph C. Coffey, Burnsville, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/295,904

(22) Filed: Oct. 17, 2016

(65) Prior Publication Data

US 2017/0034079 A1 Feb. 2, 2017

Related U.S. Application Data

(63) Continuation of application No. 13/937,314, filed on Jul. 9, 2013, now Pat. No. 9,473,361.
(Continued)

(51) Int. Cl.
*H04L 12/24* (2006.01)
*H04L 12/931* (2013.01)
(Continued)

(52) U.S. Cl.
CPC ....... *H04L 49/351* (2013.01); *H01R 13/6691* (2013.01); *H01R 24/64* (2013.01);
(Continued)

(58) Field of Classification Search
CPC ....... H04L 49/351; H04L 12/10; H04L 49/10; H04B 5/0062; H01R 13/6691; H01R 24/64; H01R 2107/00
See application file for complete search history.

(56) References Cited

U.S. PATENT DOCUMENTS 5,052,940 A 10/1991 Bengal
5,161,988 A 11/1992 Krupka
(Continued)

FOREIGN PATENT DOCUMENTS

EP 1569494 8/2005
JP 2001297044 10/2001
(Continued)

OTHER PUBLICATIONS

European Patent Office, "Extended European Search Report from EP Application No. 10741842.8 mailed Sep. 27, 2012", "from Foreign Counterpart of U.S. Appl. No. 12/705,497", Sep. 27, 2012, pp. 1-6, Published in: EP.
(Continued)

*Primary Examiner* — Thai Nguyen
(74) *Attorney, Agent, or Firm* — Fogg & Powers LLC

(57) ABSTRACT

One embodiment is directed to a wall plate device including one or more jacks. Each jack includes a rear attachment point configured to couple to one or more communication paths in a semi-permanent manner. Each jack also includes a front attachment point configured to mate with a connector of a corresponding physical communication media, and to couple such physical communication media to the rear attachment point. Each jack also includes a media reading interface configured to interface with a PLM interface of a connector connected to the front attachment point. The wall plate device also includes a programmable processor coupled to each of the media reading interfaces and configured to access a storage device of a connector connected to the front attachment point through the media reading interface to obtain PLM information. The programmable processor is configured to communicate the PLM information to another device.

20 Claims, 17 Drawing Sheets

Related U.S. Application Data

(60) Provisional application No. 61/670,300, filed on Jul. 11, 2012.

(51) Int. Cl.
*H04L 12/933* (2013.01)
*H01R 13/66* (2006.01)
*H01R 24/64* (2011.01)
*H04B 5/00* (2006.01)
*H04L 12/10* (2006.01)
*H01R 107/00* (2006.01)

(52) U.S. Cl.
CPC ........... *H04B 5/0062* (2013.01); *H04L 12/10* (2013.01); *H04L 41/0803* (2013.01); *H04L 41/50* (2013.01); *H04L 49/10* (2013.01); *H01R 2107/00* (2013.01)

(56) References Cited

U.S. PATENT DOCUMENTS

| | | |
|---|---|---|
| 5,195,902 A | 3/1993 | Bengal |
| 5,299,944 A | 4/1994 | Larabell et al. |
| 5,394,503 A | 2/1995 | Dietz, Jr. et al. |
| 5,418,334 A | 5/1995 | Williams |
| 5,420,512 A | 5/1995 | Spillane et al. |
| 5,448,675 A | 9/1995 | Leone et al. |
| 5,461,693 A | 10/1995 | Pimpinella |
| 5,463,706 A | 10/1995 | Dumont et al. |
| 5,473,715 A | 12/1995 | Schofield et al. |
| 5,483,467 A | 1/1996 | Krupka |
| 5,487,666 A | 1/1996 | DiGiovanni |
| 5,541,586 A | 7/1996 | Wise |
| 5,550,755 A | 8/1996 | Martin et al. |
| 5,606,664 A | 2/1997 | Brown et al. |
| 5,649,001 A | 7/1997 | Thomas et al. |
| 5,764,043 A | 6/1998 | Czosnowski et al. |
| 5,832,071 A | 11/1998 | Voelker |
| 5,854,824 A | 12/1998 | Bengal et al. |
| 5,876,240 A | 3/1999 | Derstine et al. |
| 5,909,464 A | 6/1999 | Cohen et al. |
| 5,910,776 A | 6/1999 | Black |
| 5,994,998 A | 11/1999 | Fisher et al. |
| 6,002,331 A | 12/1999 | Laor |
| 6,140,911 A | 10/2000 | Fisher et al. |
| 6,212,195 B1 | 4/2001 | McCormack et al. |
| 6,222,908 B1 | 4/2001 | Bartolutti et al. |
| 6,223,219 B1 | 4/2001 | Uniacke et al. |
| 6,234,830 B1 | 5/2001 | Ensz et al. |
| 6,238,235 B1 | 5/2001 | Shavit et al. |
| 6,240,090 B1 | 5/2001 | Enhager |
| 6,285,293 B1 | 9/2001 | German et al. |
| 6,300,877 B1 | 10/2001 | Schannach et al. |
| 6,307,880 B1 | 10/2001 | Evans et al. |
| 6,329,906 B1 | 12/2001 | Fisher et al. |
| 6,330,307 B1 | 12/2001 | Bloch et al. |
| 6,350,148 B1 | 2/2002 | Bartolutti et al. |
| 6,359,859 B1 | 3/2002 | Brolin et al. |
| 6,368,155 B1 | 4/2002 | Bassler et al. |
| 6,424,710 B1 | 7/2002 | Bartolutti et al. |
| 6,442,032 B1 | 8/2002 | Linares et al. |
| 6,449,348 B1 | 9/2002 | Lamb et al. |
| 6,483,203 B1 | 11/2002 | McCormack |
| 6,496,105 B2 | 12/2002 | Fisher et al. |
| 6,499,861 B1 | 12/2002 | German et al. |
| 6,516,345 B1 | 2/2003 | Kracht |
| 6,522,737 B1 | 2/2003 | Bartolutti et al. |
| 6,535,983 B1 | 3/2003 | McCormack et al. |
| 6,564,258 B1 | 5/2003 | Uniacke |
| 6,574,221 B1 | 6/2003 | Petersen |
| 6,574,586 B1 | 6/2003 | David et al. |
| 6,577,243 B1 | 6/2003 | Dannenmann et al. |
| 6,636,152 B2 | 10/2003 | Schannach et al. |
| 6,684,179 B1 | 1/2004 | David |
| 6,725,177 B2 | 4/2004 | David et al. |
| 6,778,505 B1 | 8/2004 | Bullman et al. |
| 6,880,020 B1 | 4/2005 | Rubinstein et al. |
| 6,881,096 B2 | 4/2005 | Brown et al. |
| D510,068 S | 9/2005 | Haggay et al. |
| 6,961,675 B2 | 11/2005 | David |
| 6,968,994 B1 | 11/2005 | Ashwood Smith |
| 6,976,867 B2 | 12/2005 | Navarro et al. |
| 6,993,417 B2 | 1/2006 | Osann, Jr. |
| 7,038,135 B1 | 5/2006 | Chan et al. |
| 7,039,028 B2 | 5/2006 | Chen et al. |
| 7,042,562 B2 | 5/2006 | Kiani et al. |
| 7,057,105 B2 | 6/2006 | Gottardo et al. |
| 7,075,910 B2 | 7/2006 | Chen et al. |
| 7,077,710 B2 | 7/2006 | Haggay et al. |
| 7,081,808 B2 | 7/2006 | Colombo et al. |
| 7,123,810 B2 | 10/2006 | Parrish |
| 7,126,918 B2 | 10/2006 | Roberts |
| 7,136,936 B2 | 11/2006 | Chan et al. |
| 7,142,536 B1 | 11/2006 | Gossett et al. |
| 7,143,299 B1 | 11/2006 | Rubinstein et al. |
| 7,153,142 B2 | 12/2006 | Shifris et al. |
| 7,159,026 B2 | 1/2007 | Lau et al. |
| 7,160,143 B2 | 1/2007 | David et al. |
| 7,193,422 B2 | 3/2007 | Velleca et al. |
| 7,226,217 B1 | 6/2007 | Benton et al. |
| 7,229,020 B2 | 6/2007 | Goodison et al. |
| 7,234,944 B2 | 6/2007 | Nordin et al. |
| 7,254,652 B2 | 8/2007 | Anderson et al. |
| 7,266,087 B2 | 9/2007 | Wahl |
| 7,289,334 B2 | 10/2007 | Behrens et al. |
| 7,297,018 B2 | 11/2007 | Caveney et al. |
| 7,299,287 B1 | 11/2007 | Rubinstein et al. |
| 7,312,715 B2 | 12/2007 | Shalts et al. |
| D559,186 S | 1/2008 | Kelmer |
| 7,315,224 B2 | 1/2008 | Gurovich et al. |
| 7,317,735 B1 | 1/2008 | Ojard |
| 7,324,488 B1 | 1/2008 | Rubinstein et al. |
| 7,328,033 B2 | 2/2008 | Rappaport et al. |
| D564,966 S | 3/2008 | Shifris |
| 7,352,289 B1 | 4/2008 | Harris |
| 7,377,819 B1 | 5/2008 | Cooper et al. |
| 7,382,765 B2 | 6/2008 | Kennedy et al. |
| 7,401,985 B2 | 7/2008 | Aronson et al. |
| D575,743 S | 8/2008 | Shifris et al. |
| 7,411,405 B2 | 8/2008 | Nordin |
| 7,433,363 B2 | 10/2008 | Rosen et al. |
| 7,440,647 B2 | 10/2008 | Hosking |
| 7,445,389 B2 | 11/2008 | Aronson |
| 7,453,864 B2 | 11/2008 | Kennedy et al. |
| 7,468,669 B1 | 12/2008 | Beck et al. |
| 7,479,032 B2 | 1/2009 | Hoath et al. |
| 7,483,419 B2 | 1/2009 | Bullman et al. |
| 7,499,616 B2 | 3/2009 | Aronson et al. |
| 7,517,243 B2 | 4/2009 | Caveney et al. |
| 7,540,667 B2 | 6/2009 | Murano |
| 7,551,456 B2 | 6/2009 | Behrens et al. |
| 7,564,795 B2 | 7/2009 | Stephenson et al. |
| 7,586,942 B2 | 9/2009 | Golasky et al. |
| 7,616,589 B2 | 11/2009 | Nagata et al. |
| 7,698,156 B2 | 4/2010 | Martucci et al. |
| 7,734,038 B2 | 6/2010 | Martich et al. |
| 7,744,291 B2 | 6/2010 | Dybsetter et al. |
| 7,747,272 B2 | 6/2010 | Parsa |
| 7,762,727 B2 | 7/2010 | Aronson |
| 7,765,348 B2 | 7/2010 | Dybsetter |
| 7,778,510 B2 | 8/2010 | Aronson et al. |
| 7,785,138 B2 | 8/2010 | Bonnassieux et al. |
| 7,785,930 B2 | 8/2010 | Johnson |
| 7,787,774 B2 | 8/2010 | Nelson |
| 7,808,399 B2 | 10/2010 | McVey |
| 7,809,276 B2 | 10/2010 | Ekkizogloy et al. |
| 7,809,283 B2 | 10/2010 | Hahin et al. |
| 7,819,328 B2 | 10/2010 | Levinson |
| 7,839,266 B2 | 11/2010 | Hoglund et al. |
| 7,841,780 B2 | 11/2010 | Nelson et al. |
| 7,860,399 B2 | 12/2010 | Hsieh |
| 7,870,242 B2 | 1/2011 | Nguyen |
| 7,901,144 B2 | 3/2011 | Deng |
| 7,908,406 B2 | 3/2011 | Dybsetter |

(56) References Cited

U.S. PATENT DOCUMENTS

| | | |
|---|---|---|
| 7,920,788 B2 | 4/2011 | Nelson et al. |
| 7,933,518 B2 | 4/2011 | Li et al. |
| 7,957,649 B2 | 6/2011 | Dybsetter et al. |
| 7,957,650 B2 | 6/2011 | Pan et al. |
| 7,970,283 B2 | 6/2011 | Giaretta et al. |
| 7,978,800 B2 | 7/2011 | Douma et al. |
| 8,031,992 B2 | 10/2011 | Schrodinger |
| 8,037,173 B2 | 10/2011 | Tuckey et al. |
| 8,068,739 B2 | 11/2011 | Levinson |
| 8,083,417 B2 | 12/2011 | Aronson et al. |
| 8,107,822 B2 | 1/2012 | Noble |
| 8,111,999 B2 | 2/2012 | Ekkizogloy et al. |
| 8,135,282 B2 | 3/2012 | Hosking |
| 8,155,528 B2 | 4/2012 | Nelson |
| 8,165,297 B2 | 4/2012 | Hoffmann |
| 8,200,097 B2 | 6/2012 | Cole |
| 8,225,024 B2 | 7/2012 | Dybsetter |
| 8,229,301 B2 | 7/2012 | Hahin et al. |
| 8,250,246 B2 | 8/2012 | Brockmann et al. |
| 8,267,600 B2 | 9/2012 | Dybsetter et al. |
| 2001/0001270 A1 | 5/2001 | Williams Vigliaturo |
| 2002/0138604 A1 | 9/2002 | Kopelovitz et al. |
| 2003/0046339 A1 | 3/2003 | Ip |
| 2003/0061393 A1 | 3/2003 | Steegmans et al. |
| 2003/0194912 A1 | 10/2003 | Ferentz |
| 2003/0197619 A1 | 10/2003 | Lawrence et al. |
| 2003/0219033 A1 | 11/2003 | Silvester |
| 2004/0024717 A1 | 2/2004 | Sneeringer |
| 2004/0073597 A1 | 4/2004 | Caveney et al. |
| 2005/0164548 A1 | 7/2005 | Spears et al. |
| 2005/0177640 A1 | 8/2005 | Rubinstein et al. |
| 2005/0186819 A1 | 8/2005 | Velleca et al. |
| 2005/0190768 A1 | 9/2005 | Cutler |
| 2006/0047800 A1 | 3/2006 | Caveney et al. |
| 2006/0059293 A1 | 3/2006 | Wurzburg et al. |
| 2006/0160395 A1 | 7/2006 | Macauley et al. |
| 2006/0160396 A1 | 7/2006 | Macauley et al. |
| 2006/0179144 A1 | 8/2006 | Nagase |
| 2006/0185887 A1 | 8/2006 | Neujahr |
| 2006/0203715 A1 | 9/2006 | Hunter et al. |
| 2006/0227759 A1 | 10/2006 | Bohm et al. |
| 2006/0253561 A1 | 11/2006 | Holmeide et al. |
| 2006/0268507 A1 | 11/2006 | Takahashi |
| 2006/0268747 A1 | 11/2006 | van Haalen et al. |
| 2006/0282527 A1 | 12/2006 | Chiou et al. |
| 2007/0025306 A1 | 2/2007 | Cox et al. |
| 2007/0058338 A1 | 3/2007 | Lee |
| 2007/0117444 A1 | 5/2007 | Caveney et al. |
| 2007/0153823 A1 | 7/2007 | Wojtowicz |
| 2007/0162954 A1 | 7/2007 | Pela |
| 2007/0189321 A1 | 8/2007 | Lee et al. |
| 2007/0230452 A1 | 10/2007 | Hough et al. |
| 2007/0274234 A1 | 11/2007 | Kubota |
| 2008/0159738 A1 | 7/2008 | Lavranchuk |
| 2008/0181136 A1 | 7/2008 | Watanabe et al. |
| 2008/0181138 A1 | 7/2008 | Dalberg |
| 2008/0219268 A1 | 9/2008 | Dennison |
| 2008/0265915 A1 | 10/2008 | Clark et al. |
| 2009/0074404 A1 | 3/2009 | Suryaputra et al. |
| 2009/0195349 A1 | 8/2009 | Frader-Thompson et al. |
| 2010/0020722 A1 | 1/2010 | Farkas et al. |
| 2010/0040371 A1 | 2/2010 | Wu et al. |
| 2010/0054157 A1 | 3/2010 | Farkas et al. |
| 2010/0211664 A1* | 8/2010 | Raza ............... H01R 13/6658 709/223 |
| 2010/0215049 A1* | 8/2010 | Raza ............... H01R 13/6658 370/401 |
| 2010/0215362 A1 | 8/2010 | Shimoosako et al. |
| 2010/0238003 A1 | 9/2010 | Chan et al. |
| 2011/0167269 A1 | 7/2011 | Baykal et al. |
| 2011/0277001 A1 | 11/2011 | Kaluskar et al. |
| 2012/0134366 A1 | 5/2012 | Caveney et al. |
| 2013/0148976 A1 | 6/2013 | Patel et al. |

FOREIGN PATENT DOCUMENTS

| | | |
|---|---|---|
| KR | 102008017170 | 2/2008 |
| KR | 1020110027964 | 3/2011 |
| KR | 101020053 | 9/2011 |
| WO | 2004105317 | 12/2004 |

OTHER PUBLICATIONS

U.S. Patent and Trademark Office, "Final Office Action", "U.S. Appl. No. 12/705,497", Oct. 16, 2012, pp. 1-29.

U.S. Patent and Trademark Office, "Office Action", "U.S. Appl. No. 12/705,497", Apr. 17, 2012, pp. 1-31.

Chinese Patent Office, "First Office Action from CN Application No. 201080016490.4 mailed Sep. 5, 2012", "from Foreign Counterpart of U.S. Appl. No. 12/705,501", Sep. 15, 2012, pp. 1-24, Published in: CN.

European Patent Office, "Extended European Search Report from EP Application No. 10741843.6 mailed Sep. 19, 2012", "from Foreign Counterpart of U.S. Appl. No. 12/705,501", Sep. 19, 2012, pp. 1-9, Published in: EP.

European Patent Office, "Extended European Search Report", "from Foreign Counterpart of U.S. Appl. No. 12/705,501", May 22, 2012, pp. 1-7, Published in: EP.

European Patent Office, "Extended European Search Report from EP Application No. 10741844.4 mailed Oct. 11, 2012", "from Foreign Counterpart of U.S. Appl. No. 12/705,506", Oct. 11, 2012, pp. 1-9, Published in: EP.

U.S. Patent and Trademark Office, "Office Action", "U.S. Appl. No. 12/705,506", Jun. 28, 2012, pp. 1-32.

International Searching Authority, "International Search Report from PCT Application No. PCT/US2010/024186 mailed Sep. 30, 2010", "from Foreign Counterpart of U.S. Appl. No. 12/705,506", Sep. 30, 2010, pp. 1-9, Published in: WO.

Chinese Patent Office, "First Office Action from CN Application No. 201080016472.6 mailed Sep. 4, 2012", "from Foreign Counterpart of U.S. Appl. No. 12/705,514", Sep. 4, 2012, pp. 1-14, Published in: CN.

European Patent Office, "Extended European Search Report from EP Application No. 10741845.1 mailed Oct. 11, 2012", "from Foreign Counterpart of U.S. Appl. No. 12/705,514", Oct. 11, 2012, pp. 1-6, Published in: EP.

U.S. Patent and Trademark Office, "Advisory Action", "U.S. Appl. No. 12/705,514", Nov. 14, 2012, pp. 1-4, Published in: US.

U.S. Patent and Trademark Office, "Final Office Action", "U.S. Appl. No. 12/705,514", Aug. 23, 2012, pp. 1-20, Published in: US.

U.S. Patent and Trademark Office, "Office Action", "U.S. Appl. No. 12/705,514", Mar. 15, 2012, pp. 1-25, Published in: US.

International Searching Authority, "International Search Report", "from Foreign Counterpart of U.S. Appl. No. 13/707,908", Mar. 21, 2013, pp. 1-9, Published in: WO.

U.S. Patent Office, "Notice of Allowance", "from U.S. Appl. No. 13/937,314", Jun. 15, 2016, pp. 1-11, Published in: US.

U.S. Patent Office, "Office Action", "from U.S. Appl. No. 13/937,314", Feb. 2, 2016, pp. 1-39, Published in: US.

Korean Intellectual Property Office, "International Search Report and Written Opinion", "from PCT Counterpart of U.S. Appl. No. 13/937,314", Oct. 25, 2013, pp. 1-15, Published in: KR.

Figueira et al., "10GE WAN PHY: Physical Medium Attachment (PMA)", "IEEE 802.3 Meeting, Albuquerque", Mar. 2000, pp. 1-42.

Dimitrov et al., "Embedded Internet Based System", 2008, pp. 103-107.

"Embedded Ethernet System Design Guide", Aug. 2008, Publisher: Silicon Laboratories.

"The Ethersmart Wildcard", "http://www.mosaic-industries.com/Products/WildCards/ETHx/", 2008, Publisher: Mosaic Industries, Inc.

Farkas et al., "Automatic Discovery of Physical Topology in Ethernet Networks", "Advance Information Networking and Applications, 2008. AINA 2008. 22nd International Conference on", Mar. 25-28, 2008, pp. 848-854, Publisher: IEEE, Published in: Okinawa.

(56) References Cited

OTHER PUBLICATIONS

Feuzeu et al., "A New Scheme for Interconnecting LANs With Label Switching Bridges", "Local computer Networks, 2005. 30th Anniversary. The IEEE Conference on", Nov. 17, 2005, pp. 303-311, Publisher: IEEE, Published in: Sydney.

"IntelliMAC", May 2003, pp. 1-6, Publisher: Nordx/CDT.

Kang et al., "Design and Implementation of Network Management System for Power Line Communication Network", "IEEE International Symposium on Power Line Communications and its Applications (ISPLC 2007)", Mar. 28, 2007, pp. 23-28, Publisher: IEEE.

Meredith, "Managers Missing Point of Intelligent Patching", "http://searchdatacenter.techtarget.com/news/article/0,289142,sid80_gci1099991,00.html", Jun. 21, 2005, pp. 1-2, Publisher: SearchDataCenter.com.

Milligan, "Intelligent Patching Systems Carving Out a 'Large' Niche", "http://www.cablinginstall.com/index/display/article-display/207641/articles/cabling-installation-maintenance/volume-12/issue-7/contents/technology/int", Jul. 1, 2004, pp. 1-6, vol. 12, No. 7, Publisher: Cabling Installation & Maintenance.

Mirjalily et al., "Best Multiple Spanning Tree in Metro Ethernet Networks", "Computer and Electrical Engineering, 2009. ICEE'09. Second International Conference on", Dec. 28-30, 2009, pp. 117-121, vol. 2, Publisher: IEEE, Published in: Dubai.

Feltgen, "PCT Patent Application PCT/EP2009/009036: Method and Arrangement for Identifying at Least One Object", Dec. 16, 2009, pp. 1-25, Published in: WO.

"UPnP Device Architecture 1.1", Oct. 15, 2008, pp. 1-272, Publisher: UPnP Forum.

\* cited by examiner

PHYSICAL LAYER MANAGEMENT AT A WALL PLATE DEVICE

CROSS-REFERENCE TO RELATED APPLICATIONS

This application is a continuation of U.S. patent application Ser. No. 13/937,314 filed Jul. 9, 2013 and entitled "PHYSICAL LAYER MANAGEMENT AT A WALL PLATE DEVICE", which claims the benefit of U.S. Provisional Patent Application Ser. No. 61/670,300, filed on Jul. 11, 2012 and entitled "PHYSICAL LAYER MANAGEMENT AT A WALL PLATE DEVICE", each of which are hereby incorporated herein by reference.

BACKGROUND

Conventional physical layer management (PLM) systems are typically designed to track connections that are made at a patch panel. That is, historically conventional PLM systems have been "patch panel centric" and have not included functionality to track connections that are made at other types of devices and systems in a network. For example, such PLM systems typically do not automatically track connections that are made at a switch, router, hub, gateway, access point, server computer, end-user computer, appliance computers (such as network-attached storage (NAS) devices), and nodes of a storage area network (SAN) or other types of devices. Although there are management systems that are used to manage and collect information about such devices, such management systems are typically separate from the PLM systems used to track connections made at a patch panel.

SUMMARY

One embodiment is directed to a wall plate device including one or more jacks. Each jack includes a rear attachment point configured to couple to one or more communication paths for non-service network traffic in a semi-permanent manner. Each jack also includes a front attachment point configured to mate with a connector of a corresponding physical communication media, and to couple such physical communication media to the one or more communication paths at the rear attachment point. Each jack also includes a media reading interface configured to interface with a PLM interface of a connector connected to the front attachment point. The wall plate device also includes a programmable processor coupled to each of the media reading interfaces and configured to access a storage device or other component of a connector connected to the front attachment point through the media reading interface to obtain physical layer management (PLM) information. The programmable processor is configured to communicate the PLM information to another device external to the wall plate device.

DRAWINGS

DETAILED DESCRIPTION

Figure 1:
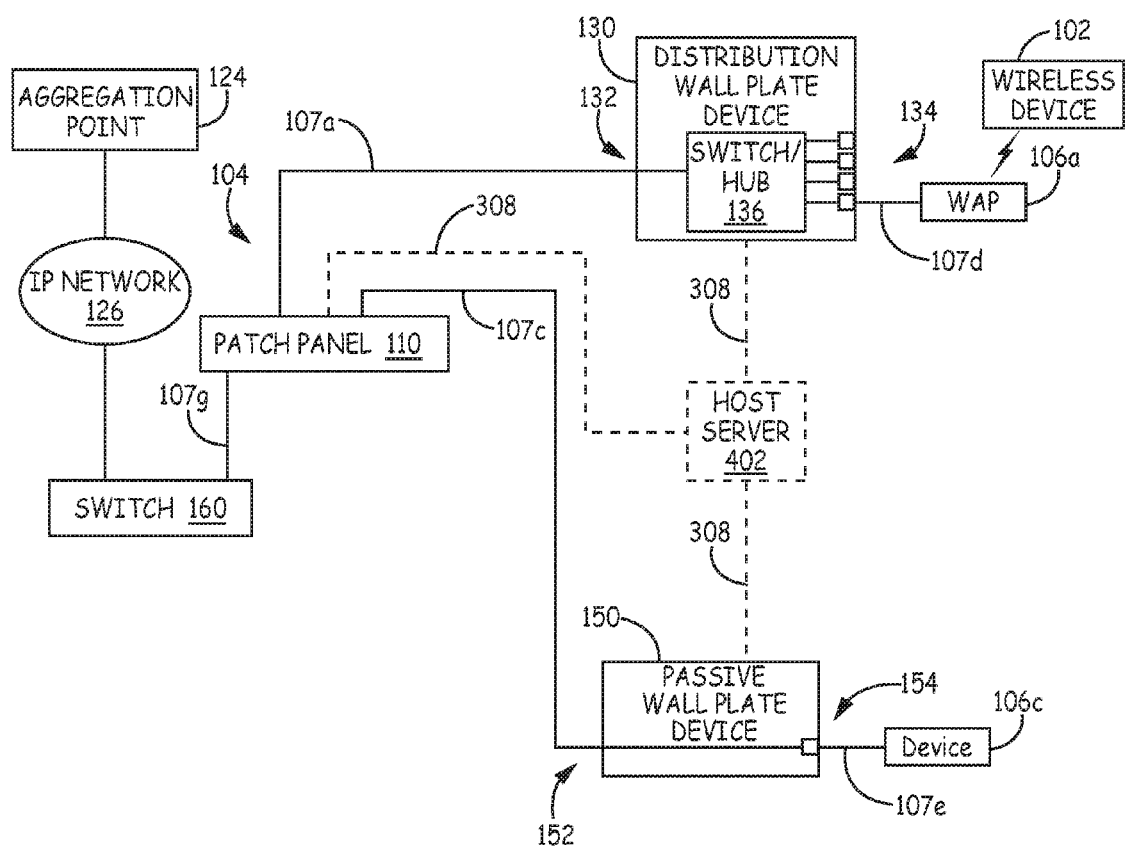
FIG. 1 is a block diagram of an example system including physical layer management at wall plate devices.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a block diagram of one example of a system including physical layer management at wall plate devices. The system is part of an IP network 126 which includes a plurality of network entities in a local area network (LAN) 104. The example network entities shown in FIG. 1 include a switch 160 (or other internetworking device such as a hub, bridge, router, or gateway), a patch panel 110, a first and second wall plate device 130, 150, as well as a first and second end user device 106a, 106c. The first and second nodes 106a, 106c are referred to herein as "end user devices" since they are outside of the core infrastructure (switch 160, patch panel 110, wall plate devices (130, 150) of the LAN 104 and can be coupled to the core infrastructure by an end user (e.g., through a wall plate device 130, 150).

Although a particular, number, type, and arrangement of network entities is shown in FIG. 1 it should be understood than any number, combination of types, and arrangement of network entities can be used, including more wall plate devices, wall plate devices coupled to more than one other network entity, etc. Examples of network entities include, for example, rack-mounted connector assemblies (such as patch panels, distribution units, and media converters for fiber and copper physical communication media), wall-mounted connector assemblies (such as boxes, jacks, wall plate devices (also referred to as "wall outlets"), and media converters for fiber and copper physical communication media), and inter-networking devices (such as switches, routers, hubs, repeaters, gateways, and access points). Examples of end user devices include, without limitation, computers, peripherals (such as printers, copiers, storage devices, and scanners), IP telephones, end user routers, end user switches, access points (e.g., wireless), networked TVs, set top boxes, and other such end user devices.

The network entities are coupled together using physical communication media 107. Each communication media 107 is a cable comprising one or more communication paths. The one or more communication paths can be formed by one or more fiber optics or one or more copper wires. As an example, the physical communication media 107 can be implemented using a simplex cable, a hybrid cable, a multi-channel cable, etc. Some physical communication media 107, such as media 107d, 107e, and 107g, include a first connector terminating a first end of the one or more communication paths and a second connector terminating a second (opposite) end of the one or more communication paths. Other examples of communication media 107, such as media 107a, 107c, can include a connector terminating a first end and a wall plate device 130, 150 terminating a second (opposite) end. In examples where the one or more communication paths are fiber optics, the connectors can be corresponding passive optical connectors or an active optical module for converting between optical signals and electrical signals. In examples where the one or more communication paths are copper wires, connectors can be a corresponding electrical connector. Some or all of the physical communication media 107 is a connectorized media segment. As used herein, a "connectorized" media segment is a segment of physical communication media that includes a connector at at least one end of the segment. The connectors are used to facilitate the easy and repeated attachment and unattachment of the media segment 107 to a jack.

Examples of connectorized media segments include CAT-5, 6, and 7 twisted-pair cables having modular connectors or plugs attached to both ends (in which case, the front connectors are implemented using compatible modular jacks) or optical cables having SC, LC, FC, LX.5, MTP, or MPO connectors (in which case, the front connectors are implemented using compatible SC, LC, FC, LX.5, MTP, or MPO connectors or adapters). The techniques described here can be used with other types of connectors including, for example, BNC connectors, F connectors, DSX jacks and plugs, bantam jacks and plugs, and MPO and MTP multi-fiber connectors and adapters.

Example physical communication media 107 include duplex fiber optic cable including one or more optical fibers. The one or more optical fibers can include single-mode or multi-mode fibers. The fiber optic cable can include a simplex cable, duplex cable, 12-fiber cable, 24-fiber cable and other fiber optic cables (such as hybrid fiber/copper cables). Other example physical communication media 107 include coaxial cable. Still other examples include multiple-fiber cable including a multi-fiber connector (for example, a suitable MPO or MTP connector) at each end of such cable.

The patch panel 110 is used to cross connect various network entities of the local area network 104, and comprises a set of port (not shown). Each port is associated with a respective jack on the front face of the patch panel 107 into which a RJ-45 connector of a communication media 107 can be inserted. Various ports of the patch panel 107 can be connected to ports of the switch 160 by connecting one or more communication mediums 107g between the front jacks of the patch panel 107 and jacks of the switch 160.

Each port is also associated with a respective rear termination point at which a horizontal run of a communication media 107 can be terminated. Each port is configured to communicatively couple the jack associated with that port (and any communication media 107 inserted therein) to the respective termination point (and any horizontal run of communication media 107 terminated thereat). In this way, a patch cord inserted into the front jack of the port can be connected to the corresponding horizontal run of twisted-pair cabling terminated at the corresponding rear termination point.

In the example shown in FIG. 1, each horizontal run terminates at its other end at a wall plate device 130, 150. Two types of wall plate devices are shown in FIG. 1.

One type of wall plate device shown in FIG. 1 is a distribution wall plate device 130. The distribution wall plate device 130 is coupled to the patch panel 107 with the communication media 107a (e.g., a CAT-5 or CAT-6 cable). The distribution wall plate device 130 includes a termination point 132 at which a horizontal run of the communication media 107a can be terminated. A first connector of the communication media 107a is connected to a first jack of the patch panel 107 and a second end of the communication media 107a is attached to the termination point of the distribution wall plate device 130.

The distribution wall plate device 130 also includes a plurality of jacks 134 (for example, RJ-45 jacks) and an ETHERNET hub or switch 136. The termination point 132 for the horizontal run and each of the jacks 134 are coupled to a respective port of the ETHERNET hub or switch 136. In this way, each of the jacks 134 is communicatively coupled to the horizontal run terminated at the termination point 132, and the connectivity provided over the horizontal run can be shared by devices connected to the jacks 134. The distribution wall plate device 130 also includes a suitable power supply or interface (not shown) for providing power to the ETHERNET hub or switch 136. Examples of ways of providing power to the ETHERNET hub or switch 136 include using Power-Over-ETHERNET technology to provide power over the horizontal run of the communication media 107a and/or over one or more communication mediums 107d connected to the jacks 134. Power can also be provided by connecting the distribution wall plate device 130 to a conventional AC mains power outlet using an external or internal power adapter.

An end user device 106a of the network 104 is coupled to other network entities in the local area network 104 by connecting one end of a physical communication media 107d (e.g., a CAT-5 or CAT-6 cable) to the end user device 106a and the other end of the communication media 107d to one of the jacks 134 of the distribution wall plate device 130. In this example, the end user device 106a comprises a wireless access point, however, any device capable of connecting to the jack 134 and communicating over the network 104 can be used. The wireless access point 106a can be wireless coupled to another device 102.

Another type of wall plate device shown in FIG. 1 is a conventional passive wall plate device 150. The passive wall plate device 150 includes a termination point 124 for a horizontal run of the communication media 107c and a corresponding jack 154. The passive wall plate device 150 is coupled to the patch panel 107 with the communication media 107c (e.g., a CAT-5 or CAT-6 cable). A first connector at a first end of the communication media 107c is connected to a first jack of the patch panel 107 and a second end of the communication media 107c is attached to a termination point 132 of the passive wall plate device 150. Each conductor in the horizontal run of twisted-pair cabling (107c) is electrically connected to a corresponding conductor in the jack 154. In this way, the jack 154 is communicatively coupled to the horizontal run terminated at the termination point 124, and the connectivity provided over the horizontal run can be shared by any devices connected to the jack 154.

In the example shown in FIG. 1, an end user device 106c is connected to the local area network 104 by connecting one end of a communication media 107e (e.g., a CAT-5 or CAT-6 cable) to the end user device 106c and the other end of the communication media 107e to the jack 154 of the passive wall plate device 150.

At least some of the network entities are designed for use with segments of physical communication media 107 that have identifier and attribute information (also referred to herein as "PLM information") stored in or on them.

The identifier and attribute information is stored in or on the segment of physical communication media 107 in a manner that enables the stored information, when the segment is attached to a jack (134, 154), to be read by a programmable processor associated with the network entity. Examples of PLM information that can be stored in or on a segment of physical communication media 107 include, without limitation, an identifier that uniquely identifies that particular segment of physical communication media 107 (similar to an ETHERNET Media Access Control (MAC) address but associated with the physical communication media 107 and/or connector attached to the physical communication media 107), a part number, a plug or other connector type, a cable or fiber type and length, a serial number, a cable polarity, a date of manufacture, a manufacturing lot number, information about one or more visual attributes of physical communication media 107 or a connector attached to the physical communication media 107 (such as information about the color or shape of the physical communication media 107 or connector or an image of the physical communication media 107 or connector), and other information used by an Enterprise Resource Planning (ERP) system or inventory control system. PLM information can also include testing or media quality or performance information which, for example, can be the results of testing that is performed when a particular segment of media 107 is manufactured. In other embodiments, alternate or additional data is stored in or on the media segments 107.

Also, as noted below, in some embodiments, the PLM information stored in or on the segment of physical communication media 107 can be updated. For example, the PLM information stored in or on the segment of physical communication media 107 can be updated to include the results of testing that is performed when a segment of physical media 107 is installed or otherwise checked. In another example, such testing information is supplied to an aggregation point 124 and stored in a data store maintained by the aggregation point 124. In another example, the PLM information stored in or on the segment of physical communication media 107 includes a count of the number of times that a connector attached to a segment of physical communication media 107 has been inserted into jack (134, 154). In such an example, the count stored in or on the segment of physical communication media 107 is updated each time the connector 102 is inserted into jack (134, 154). This insertion count value can be used, for example, for warranty purposes (for example, to determine if the connector has been inserted more than the number of times specified in the warranty) or for security purposes (for example, to detect unauthorized insertions of the physical communication media 107).

In the particular embodiment shown in FIG. 1, each of the jacks (134, 154) of the network entities 101 comprises a respective media reading interface via which the respective programmable processor is able to determine if a physical communication media segment 107 is attached to that jack (134, 154) and, if one is, to read the identifier and attribute information (PLM information) stored in or on the attached segment (if such information is stored therein or thereon). The programmable processor associated with each network entity is communicatively coupled to each of the media reading interfaces using a suitable bus or other interconnect.

Each programmable processor is configured to execute software or firmware that causes the programmable processor to carry out various functions described below. Each programmable processor also includes suitable memory that is coupled to the programmable processor for storing program instructions and data. In general, the programmable processor determines if a physical communication media segment 107 is attached to a jack (134, 154) with which that processor is associated and, if one is, to read the identifier and attribute information (PLM information) stored in or on the attached physical communication media segment 107 (if the segment 107 includes such information stored therein or thereon) using the associated media reading interface.

Each programmable processor is also configured to communicate physical layer information to devices that are coupled to the IP network 126. The physical layer information (PLI) includes information about the network entities associated with that programmable processor (also referred to here as "device information") as well as information about any segments of physical media 107 attached to the jacks (134, 154) of those network entities (also referred to here as "PLM information") The device information includes, for example, an identifier for each network entity, a type identifier that identifies the network entity's type, and jack priority information that associates a priority level with each jack. The PLM information includes identity and attribute information that the programmable processor has read from attached physical media segments 107 that have identifier and attribute information stored in or on it. The PLI may also include information about physical communication media 107 that does not have identifier or attribute information stored in or on it. This latter type of PLI can be manually input at the time the associated physical media segments 107 are attached to the network entity (for example, using a management application executing on the programmable processor that enables a user to configure and monitor the network entity).

The system includes functionality that enables the physical layer information that the network entities capture to be used by application-layer functionality outside of traditional physical-layer management application domain. That is, the physical layer information is not retained in a PLM "island" used only for PLM purposes but is instead made available to other applications. In the particular embodiment shown in FIG. 1, the system includes an aggregation point 124 that is communicatively coupled to the network entities via the IP network 126.

The aggregation point 124 includes functionality that obtains physical layer information from the network entities (and other devices) and stores the physical layer information in a data store.

The aggregation point 124 can be used to receive physical layer information from various types of network entities that have functionality for automatically reading information stored in or on the segment of physical communication media 107. Examples of such network entities are noted above. Also, the aggregation point 124 and aggregation functionality can also be used to receive physical layer information from other types of devices that have functionality for automatically reading information stored in or on the segment of physical communication media 107. Examples of such devices include end-user devices—such as computers, peripherals (such as printers, copiers, storage devices, and scanners), and IP telephones—that include functionality for automatically reading information stored in or on the segment of physical communication media.

The aggregation point 124 can also be used to obtain other types of physical layer information. For example, in this embodiment, the aggregation point 124 also obtains information about physical communication media segments 107 that is not otherwise automatically communicated to an aggregation point 124. One example of such information is information about non-connectorized physical communication media segments that do not otherwise have information stored in or on them that are attached to a network entity (including, for example, information indicating which jacks of the devices are connected to which jacks of other devices in the network as well as media information about the segment). Another example of such information is information about physical communication media segments that are connected to devices that are not be able to read media information that is stored in or on the media segments that are attached to their jacks and/or that are not able to communicate such information to the aggregation point 124 (for example, because such devices do not include such functionality, because such devices are used with media segments that do not have media information stored in or on them, and/or because bandwidth is not available for communicating such information to the aggregation point 124). In this example, the information can include, for example, information about the devices themselves (such as the devices' MAC addresses and IP addresses if assigned to such devices), information indicating which jacks of the devices are connected to which jacks of other devices in the network (for example, other network entities), and information about the physical media attached to the jacks of the devices. This information can be provided to the aggregation point 124, for example, by manually entering such information into a file (such as a spreadsheet) and then uploading the file to the aggregation point 124 (for example, using a web browser) in connection with the initial installation of each of the various items. Such information can also, for example, be directly entered using a user interface provided by the aggregation point 124 (for example, using a web browser).

The aggregation point 124 can also obtain information about the layout of the building or buildings in which the network is deployed, as well as information indicating where each network entity and physical media segment 107 is located within the building. This information can be, for example, manually entered and verified (for example, using a web browser) in connection with the initial installation of each of the various items. In one implementation, such location information includes an X, Y, and Z location for each jack or other termination point for each physical communication media segment (for example, X, Y, and Z location information of the type specified in the ANSI/TIA/EIA 606-A Standard (Administration Standard For The Commercial Telecommunications Infrastructure)).

The aggregation point 124 can obtain and maintain testing, media quality, or performance information relating to the various segments of physical communication media that exist in the network. The testing, media quality, or performance information, for example, can be results of testing that is performed when a particular segment of media is manufactured and/or when testing is performed when a particular segment of media is installed or otherwise checked.

The aggregation point 124 also includes functionality that provides an interface for external devices or entities to access the physical layer information maintained by the aggregation point 124. This access can include retrieving information from the aggregation point 124 as well as supplying information to the aggregation point 124. In this embodiment, the aggregation point 124 is implemented as "middleware" that is able to provide such external devices and entities with transparent and convenient access to the PLI. Because the aggregation point 124 aggregates PLI from the relevant devices on the IP network 126 and provides external devices and entities with access to such PLI, the external devices and entities do not need to individually interact with all of the devices in the IP network 126 that provide PLI, nor do such devices need to have the capacity to respond to requests from such external devices and entities.

The aggregation point 124, in the embodiment shown in FIG. 1, implements an application programming interface (API) by which application-layer functionality can gain access to the physical layer information maintained by the aggregation point 124 using a software development kit (SDK) that describes and documents the API.

Any other portion of the IP network 126 is typically implemented using one or more inter-networking devices. As noted above, an inter-networking device is a type of network entity and can be configured to read PLM information that is stored in or on the segments of physical media 107 that are attached to its jacks and to communicate the PLM information it reads from the attached segments of media 107 (as well as information about the inter-networking device itself) to the aggregation point 124 like any other network entity described here.

The aggregation point 124 can be implemented on a standalone network node (for example, a standalone computer running appropriate software) or can be integrated along with other network functionality (for example, integrated with an element management system or network management system or other network server or network element). Moreover, the functionality of the aggregation point 124 can be distribute across many nodes and devices in the network and/or implemented, for example, in a hierarchical manner (for example, with many levels of aggregation points).

Moreover, the aggregation point 124 and the network entities are configured so that the aggregation point 124 can automatically discover and connect with the network entities that provide PLI to an aggregation point 124 that are on the network 126. In this way, when network entities that are able to provide PLI to an aggregation point 124 are coupled to the IP network 126, an aggregation point 124 is able to automatically discover the network entities and start aggregating physical layer information for that network entity without requiring the person installing the network entity to have knowledge of the aggregation points 124 that are on the IP network 126. Similarly, when an aggregation point 124 is coupled to the IP network 126, the aggregation point 124 is able to automatically discover and interact with devices that are capable of providing PLI to an aggregation point without requiring the person installing the aggregation point 124 to have knowledge of the devices that are on the IP network 126. Thus, the physical-layer information resources described here can be easily integrated into the IP network 126.

The aggregation point 124 can aggregate the PLI from the network entities and physical communication media to associate jacks of network entities (e.g., patch panels) with physical communication media. For example, the PLI can be used to associate a given jack of a network entity with a give physical communication media and/or a particular connector of the physical communication media. Aggregating the PLI can include aggregating multiple such associations to determine physical layer connections between devices.

More information about physical layer information and the aggregation point 124 can be found in U.S. Provisional Patent Application Ser. No. 61/124,624, filed on Feb. 13, 2009, titled "MANAGED CONNECTIVITY SYSTEMS AND METHODS" and U.S. patent application Ser. No. 12/705,497, filed on Feb. 12, 2010, titled "AGGREGATION OF PHYSICAL LAYER INFORMATION RELATED TO A NETWORK", both of which are hereby incorporated herein by reference.

The IP network 126 can include one or more local area networks and/or wide area networks (including for example the Internet). As a result, the aggregation point 124 need not be located at the same site as the network entities.

Various conventional IP networking techniques can be used in deploying the system of FIG. 1. For example, conventional security protocols can be used to secure communications if they are communicated over a public or otherwise unsecure communication channel (such as the Internet or over a wireless communication link).

In one implementation of the embodiment shown in FIG. 1, each network entity, each jack (134, 154) of each network entity, and each media segment 107 is individually addressable. Where IP addresses are used to individually address each network entity, a virtual private network (VPN) dedicated for use with the various network entities can be used to segregate the IP addresses used for the network entities from the main IP address space that is used in the IP network 126.

In the particular embodiment shown in FIG. 1, the system also supports conventional physical layer management (PLM) operations such as the tracking of moves, adds, and changes of the segments of physical media that are attached to the jacks (134, 154) of the network entities and providing assistance with carrying out moves, adds, and changes. PLI provided by the aggregation point 124 can be used to improve upon conventional "guided MAC" processes. For example, information about the location of the jack (134, 154) and the visual appearance (for example, the color or shape) of the relevant physical media segment 107 (or connector attached thereto) can be communicated to a technician to assist the technician in carrying out a move, add, or change. This information can be communicated to a computer or smartphone used by the technician. Moreover, the PLI functionality that resides in the system can also be used to verify that a particular MAC was properly carried out by checking that the expected physical media segment is located in the expected jack (134, 154). If that is not the case, an alert can be sent to the technician so that the technician can correct the issue.

The PLM functionality included in the system can also support conventional techniques for guiding the technician in carrying out a MAC (for example, by illuminating one or more light emitting diodes (LEDs) to direct a technician to a particular network entity and/or to a particular jack (134, 154) or by displaying messages on a liquid crystal display (LCD) included on or near the network entity. Other PLM functions include keeping historical logs about the media 107 connected to the network entity.

In addition to network entities, the techniques described here for reading PLM information stored in or on a segment of physical communication media 107 can be used in one or more end user devices of the network. For example, computers (such as, laptops, servers, desktop computers, or special-purpose computing devices such as IP telephones, IP multi-media appliances, and storage devices) can be configured to read PLM information that is stored in or on the segments of physical communication media 107 that are attached to their jacks and to communicate the media information the read from the attached segments of media 107 (as well as information about the devices themselves) to an aggregation point 124 as described here.

In an example, the wall plate devices 130, 150 can communicate PLI with the aggregation point 124 along with "non-service" network traffic over the communication media 107*a* and 107*c* respectively. As used herein "non-service" network traffic is defined with respect to the wall plate devices (130, 150), such that network traffic destined for or originating from an end user device (106*a*, 106*c*) is "non-service" network traffic. In some examples, the wall plate devices 130, 150 can communicate PLI through a host server 402. In such examples, the host server 402 is communicatively coupled to each of the wall plate devices 130, 150 using appropriate physical communication media 308. The host server 402 can be coupled to the LAN 104 by connecting the host server 402 to a corresponding communication media 308 connected on the other end to a network entity (e.g., patch panel 110). Notably, the physical communication media 308 used for communication with the host server 402 is distinct from the communication media 107 used for "non-service" network traffic. Physical communication media 308, however, can be the same or a different type of communication media as the communication media 107. For example, physical communication media 308 can include CAT-5, 6, and 7 twisted-pair cables, optical cables, or coaxial cable.

The host server 402 can be configured to communicate with the aggregation point 124 over the LAN 104 and, more broadly, the IP network 126. The host server 402 can communicate PLI to/from the aggregation point 124 and also communicate PLI to/from each wall outlet device 130, 150. In this way, the PLI from each wall outlet device 130, 150 can be provided to the aggregation point 124 and the aggregation point 124 can provide information and/or commands to each wall outlet device 130, 150. In some examples, one or more of the wall outlet devices 130, 150 can communicative wirelessly as described in more detail below.

Figure 2:
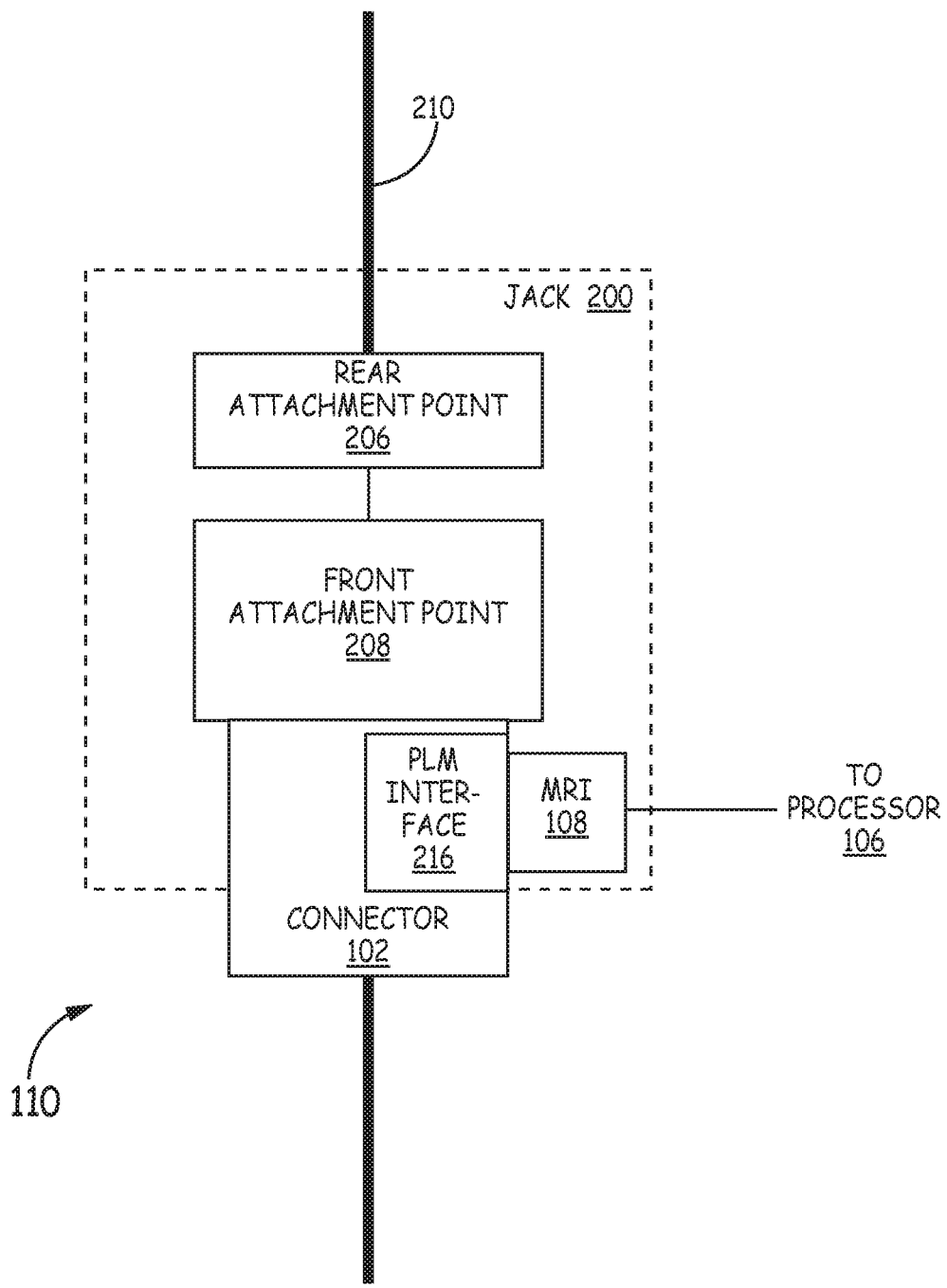
FIG. 2 is a block diagram of one high-level embodiment of a jack and media reading interface that are suitable for use as a jack in a wall pate device of the system of FIG. 1.

FIG. 2 is a block diagram of one high-level embodiment of a jack 200 and media reading interface 108 that are suitable for use as a jack 134, 154 in a wall pate device 130, 150 of FIG. 1.

Each jack 200 comprises a first attachment point 206 and a second attachment point 208. The first attachment point 206 is used to attach one or more communication paths 210 to the jack 200, and the second attachment point 208 is used to attach a segment of physical communication media 107 to the jack 200. The one or more communication paths 210 can be part of the wall outlet device 130, 150 and connected to appropriate components within the wall outlet device 130, 150 or can be part of another communication media 107 that is connected to another network entity (e.g., patch panel 110) at its other end.

In the particular embodiment shown in FIG. 2, the first attachment point 206 is located near the rear of the jack 200. As a consequence, the first attachment point 206 is also referred to here as the "rear attachment point" 206. Also, in this embodiment, the rear attachment point 206 is configured to attach the one or more communication paths 210 to the jack 200 in a semi-permanent manner. As used herein, a semi-permanent attachment is one that is designed to be changed relatively infrequently, if ever. This is also referred to sometimes as a "one-time" connection. Examples of suitable rear attachment points 206 include punch-down blocks (in the case of copper physical media) and fiber adapters, fiber splice points, and fiber termination points (in the case of optical physical media).

In the embodiment shown in FIG. 2, the second attachment point 208 is located near the front of the jack 200. As a consequence, the second attachment point 208 is also referred to here as the "front attachment point" 208. In the embodiment shown in FIG. 2, the front attachment point 208 for each jack 200 is designed for use with "connectorized" media segments 107 that have identifier and attribute information stored in or on them. As used herein, a "connectorized" media segment is a segment of physical communication media that includes a connector 102 at at least one end of the segment. The front attachment point 208 is implemented using a suitable connector or adapter that mates with the corresponding connector 102 on the end of the media segment 107. The connector 102 is used to facilitate the easy and repeated attachment and unattachment of the media segment 107 to the jack 200. Examples of connectorized media segments include CAT-5, 6, and 7 twisted-pair cables having modular connectors or plugs attached to both ends (in which case, the front attachment point 208 is implemented using compatible modular plugs) or optical cables having SC, LC, FC, LX.5, MTP, or MPO connectors (in which case, the front attachment point 208 is implemented using compatible SC, LC, FC, LX.5, MTP, or MPO connectors or adapters). The techniques described here can be used with other types of connectors including, for example, BNC connectors, F connectors, DSX jacks and plugs, bantam jacks and plugs, and MPO and MTP multi-fiber connectors and adapters.

Each jack 200 communicatively couples the respective rear attachment point 206 to the respective front attachment point 208. As a result, one or more communication paths 210 attached to the respective rear attachment point 206 are communicatively coupled to any media segment 107 attached to the respective front attachment point 208. In one implementation, each jack 200 is designed for use with one or more communication paths 107 and a media segment 107 that comprise the same type of communication path(s), in which case each jack 200 communicatively couples the one or more communication paths 210 attached to the respective rear attachment point 206 to any media segment 107 attached to the respective front attachment point 208 at the physical layer level without any media conversion. In other implementations, each jack 200 communicatively couples the one or more communication paths 210 attached to the respective rear attachment point 206 to any media segment 107 attached to the respective front attachment point 208 in other ways (for example, using a media converter if the rear one or more communication paths 210 and the media segment 107 comprise different types of communication paths).

As shown in FIG. 2, the jack 200 is configured for use with media segments 107 that include a PLM interface 216 that, when the corresponding connector 214 is inserted into (or otherwise attached to) a front attachment point 208 of the jack 200, communicatively couples a storage device or other component(s) to a corresponding media reading interface 108 so that the associated programmable processor 106 can obtain PLM information from the storage device or other component(s). In one implementation of the embodiment shown in FIG. 2, each connector 102 itself houses the storage device or other component(s) and the PLM interface can be implemented by incorporating appropriate electrical contacts in the connector 102.

In another implementation of such an embodiment, the storage device and other component(s) are housed within a housing that is separate from the connector 102. In such an implementation, the housing is configured so that it can be snapped onto the media segment 107 or the connector 102, with the PLM interface 216 positioned relative to the connector 102 so that the PLM interface 216 will properly mate with the media reading interface 108 when the connector 102 is inserted into (or otherwise attached to) the front attachment point 208.

Various examples of PLM interfaces are described in United States Patent Publication No. US 2011-0116748, filed Oct. 15, 2010, and titled "MANAGED CONNECTIVITY IN FIBER OPTIC SYSTEMS AND METHODS THEREOF," U.S. patent application Ser. No. 13/025,841, filed on Feb. 11, 2011, titled "MANAGED FIBER CONNECTIVITY SYSTEMS," and U.S. patent application Ser. No. 13/025,750, filed on Feb. 11, 2011, titled "COMMUNICATIONS BLADED PANEL SYSTEMS," U.S. Provisional Patent Application Ser. No. 61/124,624, filed on Feb. 13, 2009, titled "MANAGED CONNECTIVITY SYSTEMS AND METHODS," and U.S. patent application Ser. No. 12/705,497, filed on Feb. 12, 2010, titled "AGGREGATION OF PHYSICAL LAYER INFORMATION RELATED TO A NETWORK," all of which are hereby incorporated herein by reference. In some of these examples, a four-line PLM interface is used, where the interface includes a single data line for reading and writing data, a power line for providing power to the storage device, a ground line for providing a ground level, and an extra line reserved for future use. Also, in these examples, a storage device that supports the UNI/O bus protocol is used, where the UNI/O bus protocol is used for communicating over the single data lead. One example of such a storage device and PLM interface are the storage devices and interfaces used in the QUAREO™ family of physical layer management products that are commercially available from TE Connectivity.

EXAMPLE 1

Figure 3:
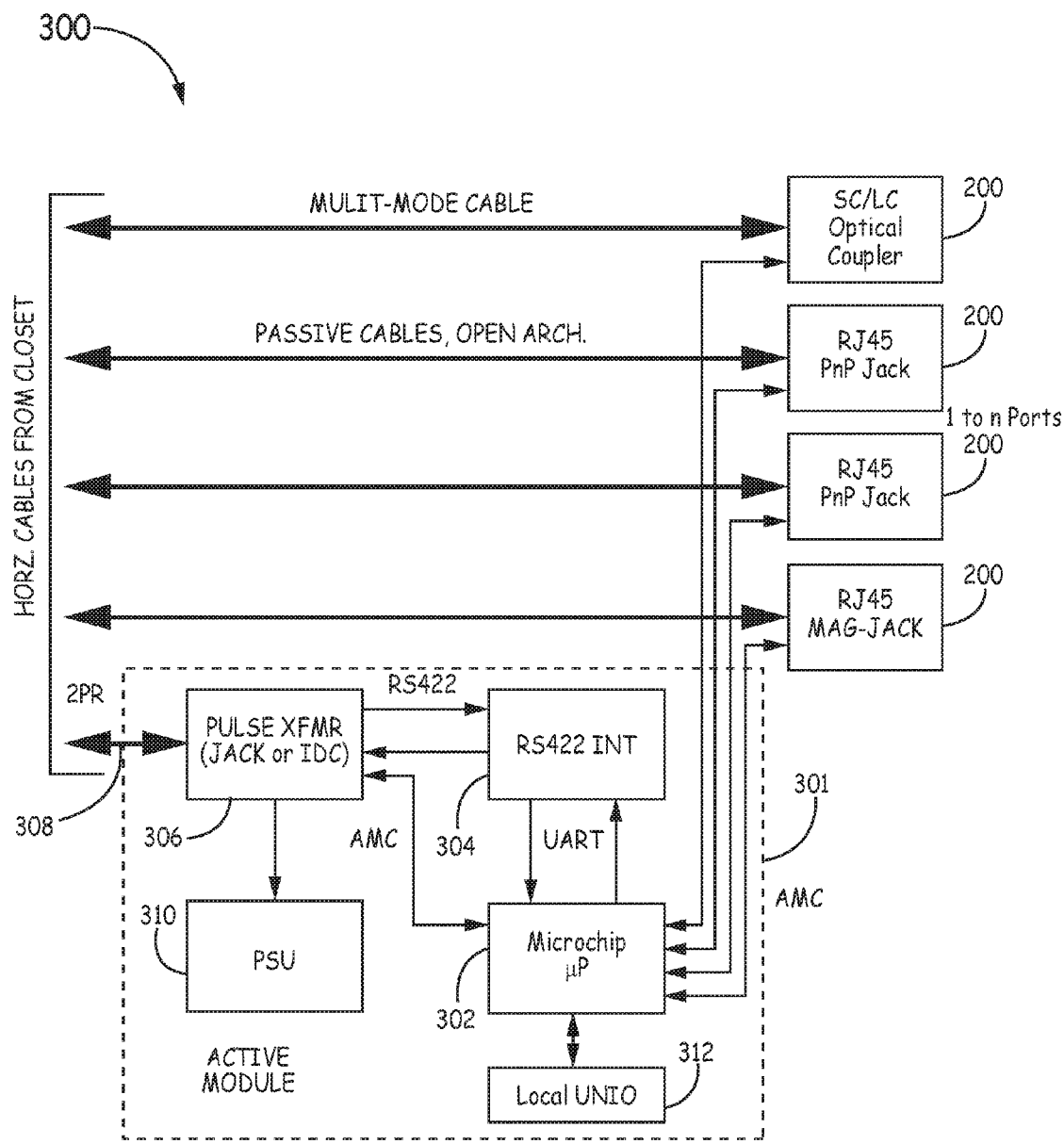
FIG. 3 is a block diagram illustrating one embodiment of a wall outlet that is suitable for use as a wall outlet device in the system of FIG. 1.

FIG. 3 is a diagram illustrating one embodiment of wall outlet 300 that is suitable for use as a wall outlet device 130, 150 in the system 100 of FIG. 1. Wall outlet 300 can have one or more jacks 200 configured to mate with one or more connectors of one or more physical communication media 107. In the example shown in FIG. 3, the wall outlet 300 includes one jack 200 for mating with an optical cable and three jacks 200 for mating with a CAT-5 or CAT-6 cable, however other numbers and types of jacks can be used. In addition to being configured to mate with a corresponding connector of a communication media 107, the wall outlet 300 terminates a horizontal run of corresponding media 107 (e.g., multi-mode optical cable, CAT-5, CAT-6 cables) for each jack 200. In the implementation illustrated in FIG. 3, the wall outlet 300 is a passive wall outlet 150 such that each jack 200 terminates a horizontal run of a corresponding media 107. In implementations in which wall outlet 300 is a distribution wall outlet 130, the horizontal run of the corresponding media 107 can be terminated at a switch (not shown) in the wall outlet 300. In the implementation shown in FIG. 3, the wall outlet 300 terminates at least one run of a passive optical cable and at least one run of a twisted pair cable (e.g., CAT-5 or CAT-6 cable).

The wall outlet 300 also includes an active module 301 that comprises a programmable processor 302 that is coupled to a storage device. The programmable processor 302 can include any suitable programmable processor, such as a microprocessor (e.g., an 8-bit microprocessor). The storage device can include, for example, an Electrically Erasable Programmable Read-Only Memory (EEPROM) or other non-volatile memory device. The programmable processor 302 and the storage device can be the same die, on separate dies, or can be incorporated into a chip scale package.

The programmable processor 302 can be configured to communicate with a storage device or other component in a communication media 107 connected to a jack 200 over a media reading interface 108 of the respective jack 200. The media reading interface 108, while the corresponding connector is inserted into a front attachment point 208 of a jack 200, communicatively couples the programmable processor 302 to the corresponding PLM interface 216 so that the programmable processor 302 can access the storage device or other entity associated with the connector of the communication media 107.

The programmable processor 302 is configured to obtain PLM information from communication media 107 connected (mated) with jacks 200 and send the PLM information to the host server 402. The programmable processor 302 can also be configured to send PLI regarding itself to the host server 402 as well as receiving information from the host server 402.

To implement the communications with the host server 402, the active module 301 can include a signaling circuit 304, such as an RS-422 signaling circuit, coupled via appropriate pulse transformers 306 to a communication media 308 which is connected at the other end to the host server 402. As such, the signaling circuit 304 can communicate with the host server 402 using a serial communication scheme over the communicate media 308. The active module 301 also includes a power supply unit 310 that is coupled to the transformer 306 for recovering power from the signals on the communication media 308, and for supplying such recovered power to the programmable processor 302 and signaling circuit 304 as described in more detail below. The active module 301 can also include a local input/output port 312 such as a UNIO port. Advantageously, the wall outlet 300 enables the non-service traffic from all of its ports (jacks 200) to travel on paths (e.g., communication media 107) that are distinct from the paths of the service traffic (e.g., communication media 308).

Figure 4:
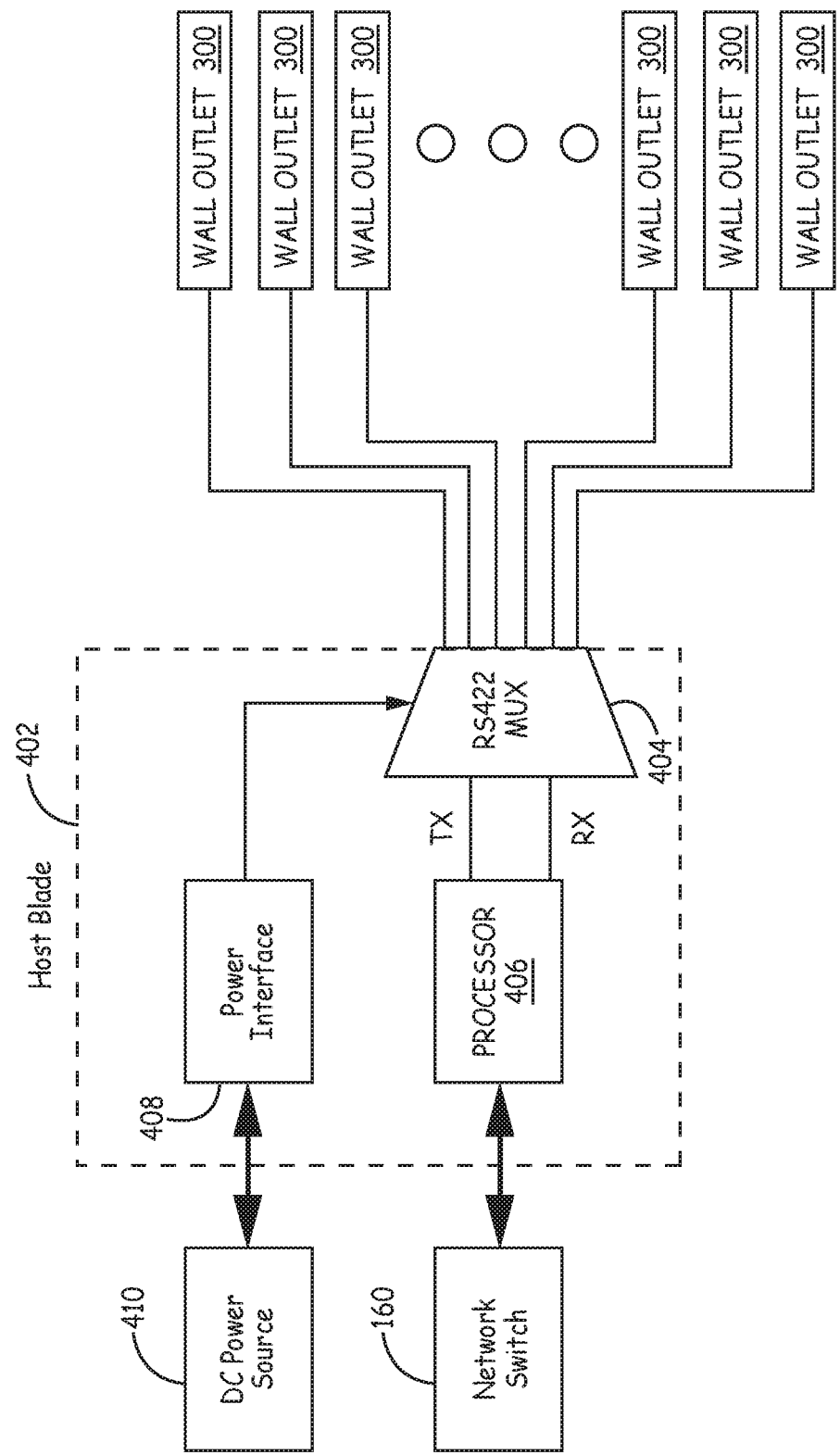
FIG. 4 is a block diagram of an example host server communicatively coupled to a plurality of wall outlets in the system of FIG. 1.

FIG. 4 is an example of the host server 402 communicatively coupled to a plurality of wall outlets 300 via a plurality of communication media 308. The host server 402 can be configured to relay communications between the plurality of wall outlets 300 and the aggregation point 124. The communications between the aggregation point 124 and the host server 402 can be in the form of IP communications sent, for example, via network switch 160 through IP network 126 to the aggregation point 124.

In the example shown in FIG. 4, the host server 402 can include a multiplex module 404 (e.g., a RS-422 MUX) to multiplex/demultiplex signals between the host server 402 and the plurality of wall outlets 300. A programmable processor 406 in the host server 402 can transmit and receive signals from the plurality of wall outlets 300 via the multiplex module 404. The programmable processor 406 can also communicate with the aggregation point 124 via the switch 160 and IP network 126. In an example, the programmable processor 402 in the host server 402 can act as a master and direct control of each slave processor 302 in a wall outlet 300. Accordingly, the master processor 406 can instruct each slave processor 302 to obtain PLM information from communication media 107 connected to jacks 200 of their respective wall outlets 300.

The host server 404 can also include a power interface 408 that can be coupled to a suitable power source 410 (e.g., DC power source). The multiplex module 404 can be coupled to the power interface 408 to simplex power and data over the communication media 308 to each wall outlet 300. That power can be recovered from the communication media 208 by the power supply unit 310 in each wall outlet 300. In other examples, conductors (e.g., a power cable) that are separate from the communication media 108 can be used to provide power to each wall outlet 300.

In an example, each communication media 308 can comprise a CAT-5 or CAT-6 cable and the host server 402 and each wall outlet 300 can implement serial communication (e.g., RS-422) therebetween using 1, 2, or 4 pairs (e.g., twisted pairs) of communication lines.

Figure 5:
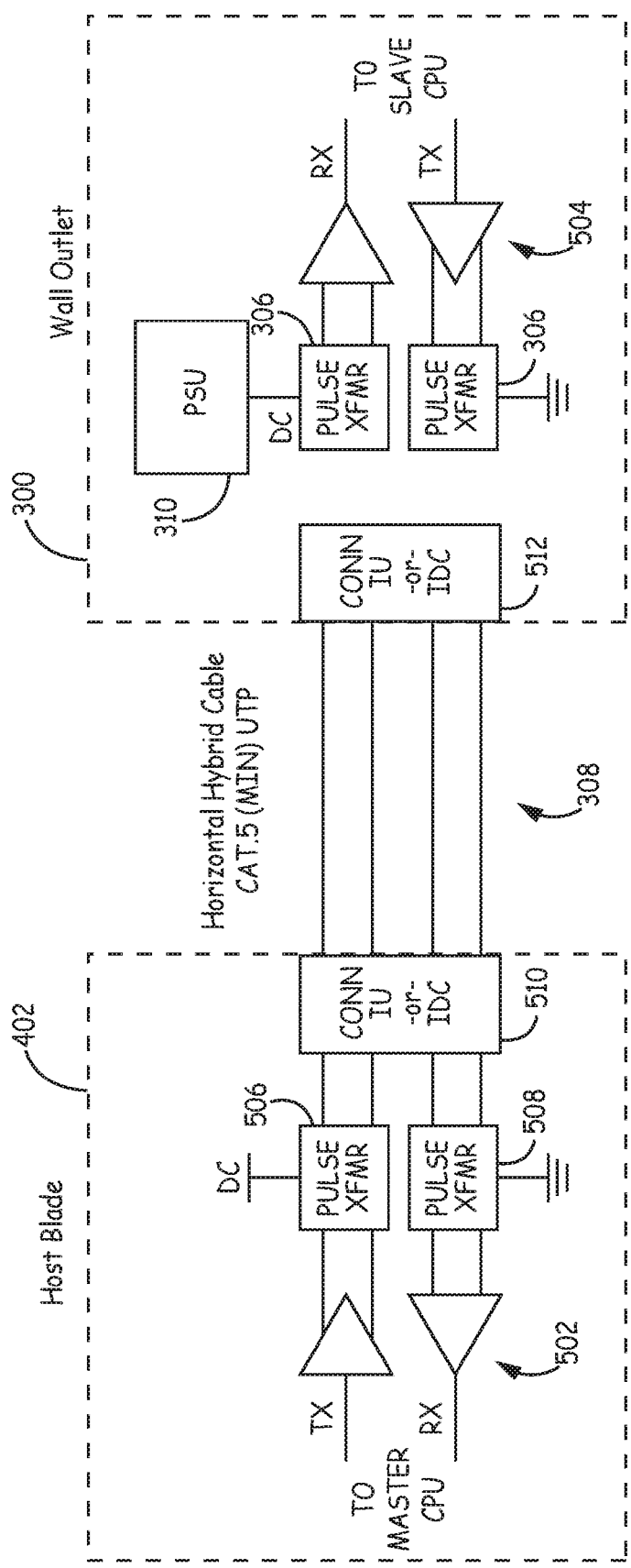
FIG. 5 is a block diagram of an example communication set-up between the host server and a wall outlet of FIG. 4.
Figure 6:
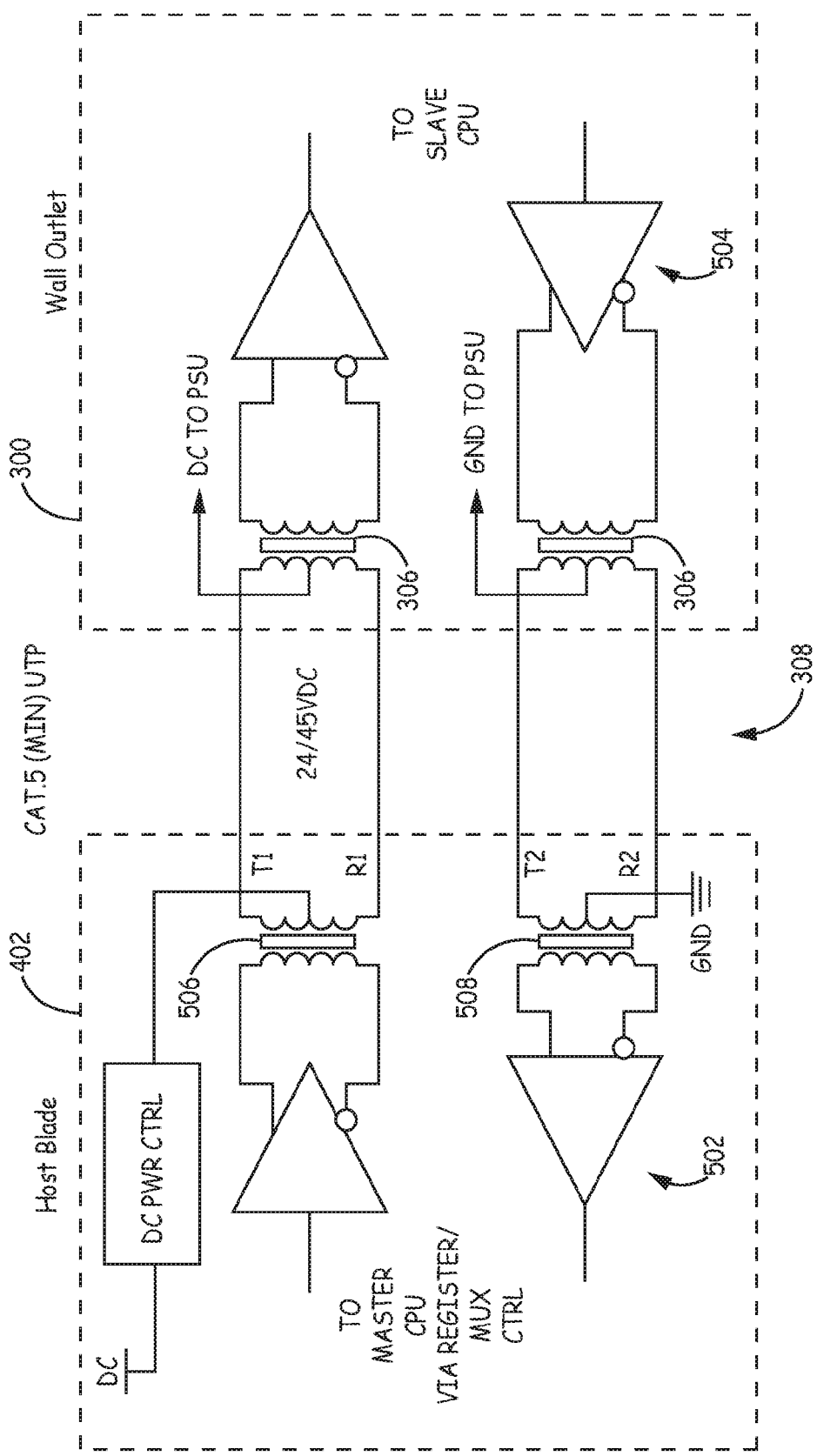
FIG. 6 is a circuit diagram of the example communication set-up between the host server and a wall outlet of FIG. 5.

FIGS. 5 and 6 illustrate an example where 2 twisted pairs in a communication media 308 are used between the host server 402 and a wall outlet 300. With 2 twisted pairs full duplex communication can be implemented with a differential transmission method. Accordingly, transmissions to the wall outlet 300 occur on a first pair and transmissions to the host server 402 occur on a second pair. The host server 402 can include suitable amplifiers 502 for transmitting and receiving signals over the respective twisted pairs. Likewise, the signaling circuit 304 in the wall outlet 300 can also include suitable amplifiers 504 for transmitting and receiving signals over the respective twisted pairs. The host server 402 can also include a first pulse transformer 506 coupled across a first twisted pair used for transmitting signals from the host server 402 to the wall outlet 300. The first pulse transformer 506 can also be coupled to DC power (e.g., from the power interface 408) for providing a DC power average on the first twisted pair. The host server 402 can also include a second pulse transformer 506 for providing DC ground average on the second twisted pair. The wall outlet 300 can include a corresponding first pulse transformer 308 and second pulse transformer 308 for recovering the DC power as a difference between the DC power in the first twisted pair and the DC power in the second twisted pair. This power can be recovered by the power supply unit 310 and provided to the programmable processor 302 and signaling circuit 304. The host server 402 and the wall outlet 300 can also include suitable jacks 510, 512 for connecting of the communication media 108.

Figure 7:
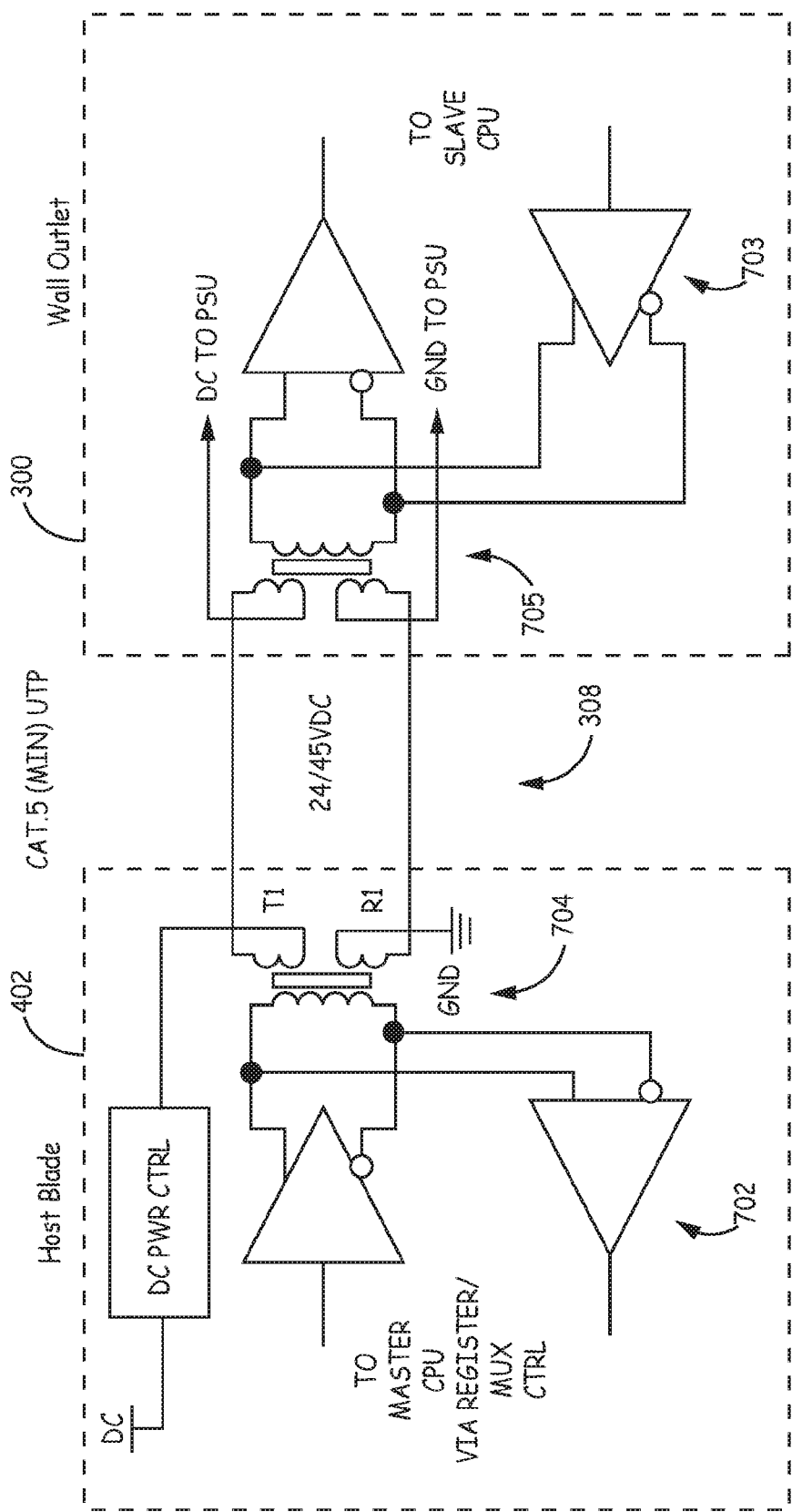
FIG. 7 is a circuit diagram of anther example communication set-up between the host server and a wall outlet of FIG. 4.

FIG. 7 illustrates an example where 1 twisted pair in a communication media 308 is used between the host server 402 and a wall outlet 300. With 1 twisted pair, half duplex communication is implemented using a differential transmission method. Accordingly, transmissions to and from the host server 402 and the wall outlet 300 occur over the same twisted pair. Similar to that described with respect to FIGS. 5 and 6, the host server 402 and the wall outlet 300 include respective amplifiers 702 for transmitting and receiving signals over the twisted pair. In this example, however, the transmit and receive amplifiers 702, 703 are both coupled to the (same) twisted pair. Additionally, a single pulse transformer 704 is used at host server 402 to couple DC power and ground onto the twisted pair. Likewise, a single pulse transformer 705 is used at the wall outlet 300 to recover the DC power from the twisted pair.

Figure 8:
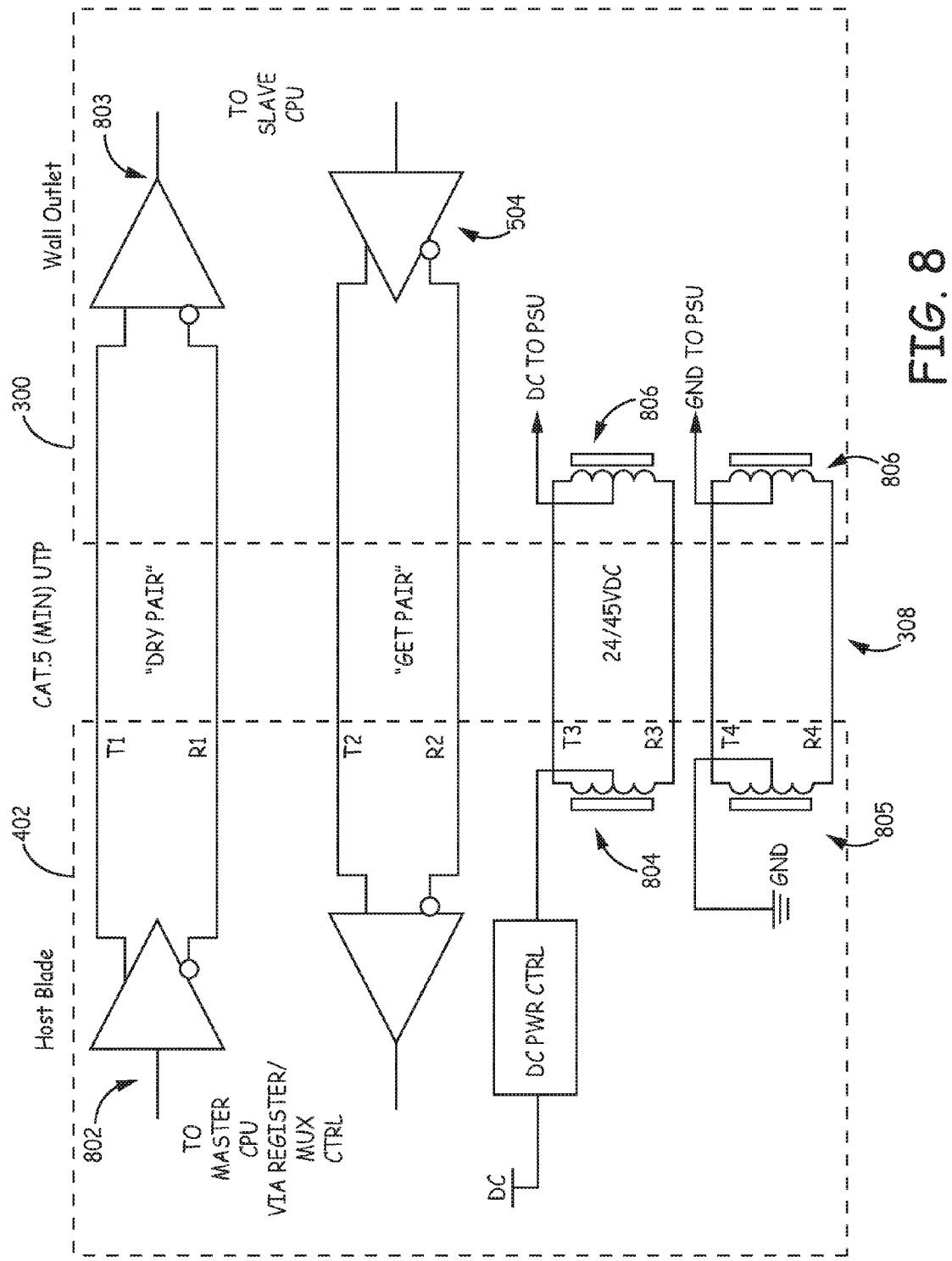
FIG. 8 is a circuit diagram of yet another example communication set-up between the host server and a wall outlet of FIG. 4.

FIG. 8 illustrates an example where 4 twisted pairs in a communication media 308 are used between the host server 402 and a wall outlet 300. In this example two of the twisted pairs are used for full duplex communication using (e.g., differential transmission) between the host server 402 and the wall outlet 300. The other two twisted pairs are used to provide DC power from the host server 402 to the wall outlet 300. Accordingly, the transmit and receive amplifiers 802 of the host server 402 are coupled to a first twisted pair and a second twisted pair respectively. Likewise, the transmit and receive amplifiers 803 of the wall outlet 300 are couple to the second twisted pair and the first twisted pair respectively. A first transformer 804 in the host server 402 is coupled to a third twisted pair and DC power to provide DC power on the third twisted pair. A second transformer 805 in the host server 402 is coupled to the fourth twisted pair to provide DC ground over the fourth twisted pair. Likewise, a first and second transformers 806 in the wall outlet 300 are coupled to the third and fourth twisted pair to recover the DC power therefrom.

EXAMPLE 2

Figure 9:
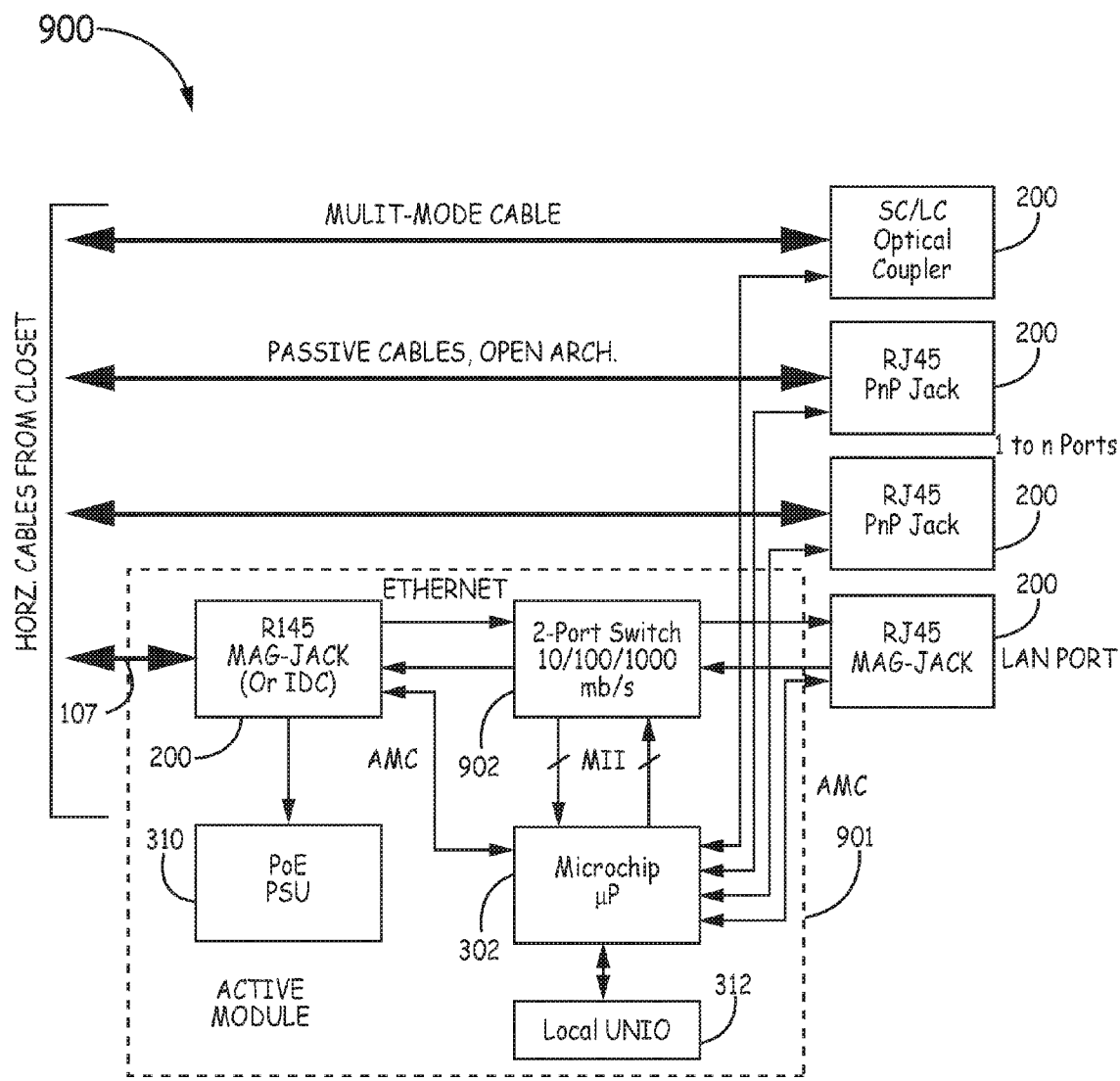
FIG. 9 is a block diagram illustrating another embodiment of a wall outlet that is suitable for use as a wall outlet device in the system of FIG. 1.

In Example 2, the wall outlet 900 that is used differs from the wall outlet 300 used in Example 1. The wall outlet 900 that is used in Example 2 is shown in FIG. 9. It is to be understood that, in practice, wall outlet 300 and wall outlet 900 may be used within the same network.

FIG. 9 illustrates another example of a wall outlet 900 that is suitable for use as a wall outlet device 130, 150 in the system 100 of FIG. 1. Wall outlet 900 can include one or more jacks 200 configured to mate with one or more connectors of one or more physical communication media 107. In the example shown in FIG. 9, the wall outlet 900 includes one jack 200 for mating with an optical cable and three jacks 200 for mating with a CAT-5 or CAT-6 cable, however other numbers and types of jacks can be used. In addition to being configured to mate with a corresponding connector of a communication media 107, the wall outlet 900 terminates a horizontal run of corresponding media 107 (e.g., multi-mode optical cable, CAT-5, CAT-6 cables) for each jack 200. In the implementation illustrated in FIG. 3, the wall outlet 300 is a partially passive wall outlet such that three of the jacks 200 terminate a horizontal run of a corresponding media 107. One horizontal run of corresponding media 107 is terminated at an active module 901 in the wall outlet 300. In the implementation shown in FIG. 9, the wall outlet 900 terminates at least one run of a passive optical cable and at least one run of a twisted pair cable (e.g., CAT-5 or CAT-6 cable).

The active module 901 comprises a programmable processor 302 that is coupled to a storage device. The programmable processor 302 can include any suitable programmable processor, such as a microprocessor (e.g., an 8-bit microprocessor). The storage device can include, for example, an Electrically Erasable Programmable Read-Only Memory (EEPROM) or other non-volatile memory device. The programmable processor 302 and the storage device can be the same die, on separate dies, or can be incorporated into a chip scale package.

The programmable processor 302 can be configured to communicate with a storage device or other component in a communication media 107 connected to a jack 200 over a media reading interface 108 of the respective jack 200. The media reading interface 108, while the corresponding connector is inserted into a front connector of a jack 200, communicatively couples the programmable processor 302 to the corresponding PLM interface 216 so that the programmable processor 302 can access the storage device or other entity associated with the connector of the communication media 107.

The programmable processor 302 is configured to obtain PLM information from communication media 107 connected (mated) with jacks 200 and send the PLM information to the aggregation point 124. The programmable processor 302 can also be configured to send PLI regarding itself to the aggregation point 124 as well as receiving information from the aggregation point 124.

To implement the communications with the aggregation point 124, the programmable processor 302 can be configured to communicate with a switch 902 within the active module 901. The switch 902 can be coupled to the programmable processor 302 and can also be coupled to a jack 200 for connection of physical communication media 107 to an end user device 106 and to another jack 200 for connection of a horizontal run of physical communication media 107 to a network entity (e.g., patch panel 110). Accordingly, the switch 902 can function to relay information between the network entity (e.g., switch 160) and an end user device 106 connected to the jack 200, and between the network entity (e.g., switch 160) and the programmable processor 302. The programmable processor 302 can use this connection with the switch 902 to communicate with the aggregation point 124. For example, the programmable processor 302 can communicate PLI to the switch 902 which can provide the PLI over the network 104 to the aggregation point 124. Advantageously, this configuration enables communication between the aggregation point 124 and the programmable processor 302 to be implemented over the same communication media 107 that are used for "non-service" network traffic. Accordingly, no additional communication media 308 need be run. Moreover, this configuration can be easily retrofit into existing networks due to the lack of additional components required outside of the wall outlet 900. Finally, the wall outlet 900 enables the non-service traffic from all of its ports (jacks 200), except for one (or more) port(s), to travel on paths (e.g., communication medium 107) that are distinct from the paths of the service traffic (e.g., communication mediums 308).

The active module 901 can also includes a power supply unit 310 to recover power from the communication media 107, such as, for example, by power over Ethernet (PoE) for powering of the programmable processor 302 and switch 902. Line power can also be used as an option in non-PoE installations.

EXAMPLE 3

Figure 10:
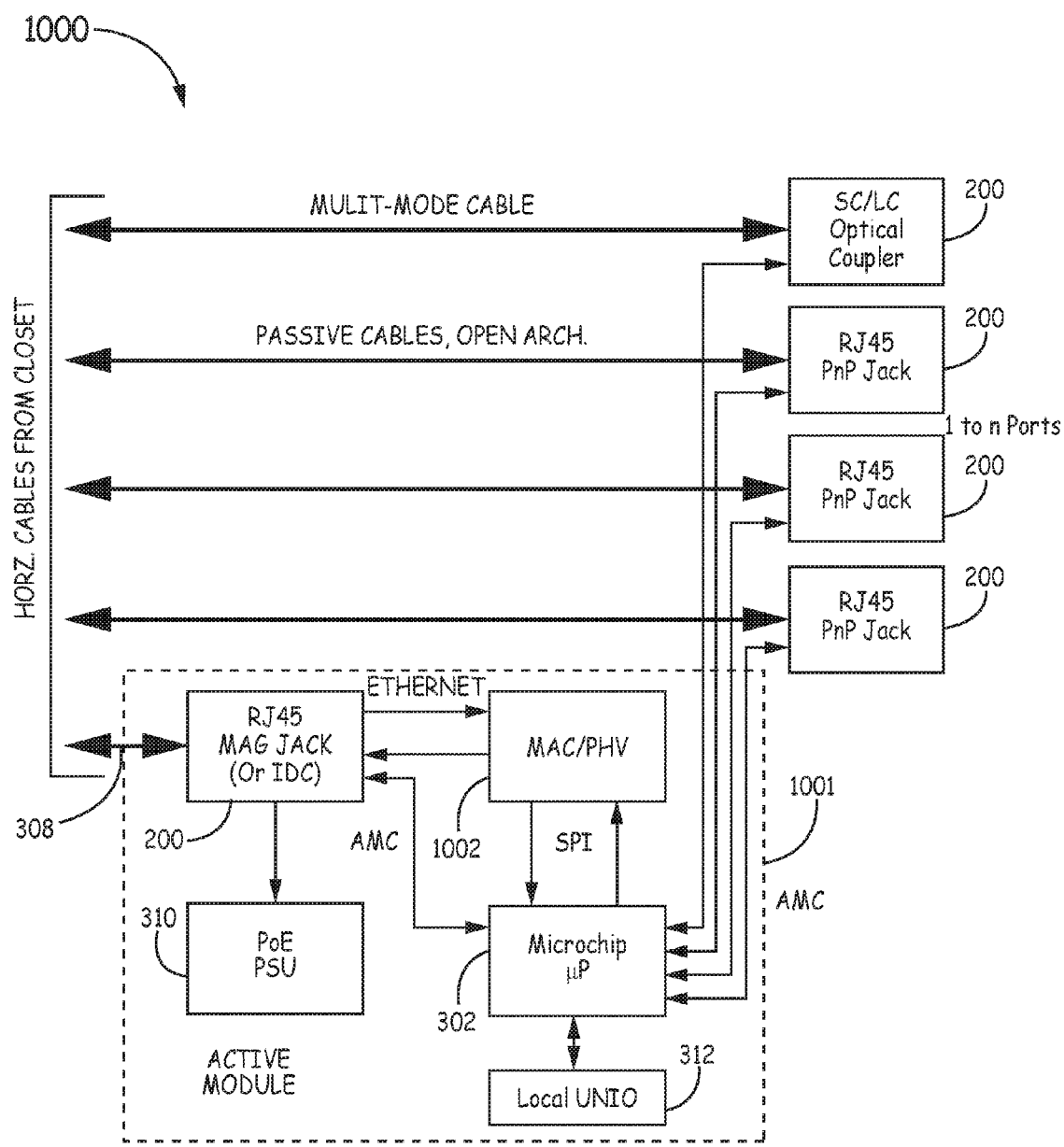
FIG. 10 is a block diagram illustrating yet another embodiment of a wall outlet that is suitable for use as a wall outlet device in the system of FIG. 1.

FIG. 10 illustrates another example of a wall outlet 1000 that is suitable for use as a wall outlet device 130, 150 in the system 100 of FIG. 1. The wall outlet 1000 is similar to the wall outlet 900 except, here, the communications to the aggregation point 124 are over a communication media 308 that is distinct from the communication media 107 used for "non-service" network traffic.

Wall outlet 1000 can include one or more jacks 200 configured to mate with one or more connectors of one or more physical communication media 107. In the example shown in FIG. 10, the wall outlet 1000 includes one jack 200 for mating with an optical cable and three jacks 200 for mating with a CAT-5 or CAT-6 cable, however other numbers and types can jacks can be used. In addition to being configured to mate with a corresponding connector of a communication media 107, the wall outlet 1000 terminates a horizontal run of corresponding media 107 (e.g., multi-mode optical cable, CAT-5. CAT-6 cables) for each jack 200. In the implementation illustrated in FIG. 10, the wall outlet 100 is a passive wall outlet 150 such that each jack 200 terminates a horizontal run of a corresponding media 107. In implementations in which wall outlet 1000 is a distribution wall outlet 130, the horizontal run of the corresponding media 107 can be terminated at a switch (not shown) in the wall outlet 1000. In the implementation shown in FIG. 10, the wall outlet 1000 terminates at least one run of a passive optical cable and at least one run of a twisted pair cable (e.g., CAT-5 or CAT-6 cable).

The wall outlet 1000 includes an active module 1001 comprising a programmable processor 302 that is coupled to a storage device. The programmable processor 302 can include any suitable programmable processor, such as a microprocessor (e.g., an 8-bit microprocessor). The storage device can include, for example, an Electrically Erasable Programmable Read-Only Memory (EEPROM) or other non-volatile memory device. The programmable processor 302 and the storage device can be the same die, on separate dies, or can be incorporated into a chip scale package.

The programmable processor 302 can be configured to communicate with a storage device or other component in a communication media 107 connected to a jack 200 over a media reading interface 108 of the respective jack 200. The media reading interface 108, while the corresponding connector is inserted into a front connector of a jack 200, communicatively couples the programmable processor 302 to the corresponding PLM interface 216 so that the programmable processor 302 can access the storage device or other entity associated with the connector of the communication media 107.

The programmable processor 302 is configured to obtain PLM information from communication media 107 connected (mated) with jacks 200 and send the PLM information to the aggregation point 124. The programmable processor 302 can also be configured to send PLI regarding itself to the aggregation point 124 as well as receiving information from the aggregation point 124.

To implement the communications with the aggregation point 124, the programmable processor 302 can be configured to communicate with a media access control/physical layer (MAC/PHY) device 1002 within the wall outlet 100. The MAC/PHY 1002 can be coupled to the programmable processor 302 and can also be coupled to a jack 200 for connection of physical communication media 308 to a network entity (e.g., patch panel 110). Accordingly, the MAC/PHY 1002 can translate and forward information between the programmable processor 302 and the network entity. The programmable processor 302 can use this connection with the MAC/PHY 1002 to communicate with the aggregation point 124. For example, the programmable processor 302 can communicate PLI to the MAC/PHY 1002 which can provide the PLI over the network 104 to the aggregation point 124. Advantageously, the wall outlet 1000 enables the non-service traffic from all of its ports (jacks 200) to travel on paths (e.g., communication media 107) that are distinct from the paths of the service traffic (e.g., communication media 308).

The active module 1001 can also include a power supply unit 310 to recover power from the communication media 308, such as, for example, by power over Ethernet (PoE) for powering of the programmable processor 302 and MAC/PHY 1002. Line power can also be used as an option in non-PoE installations.

EXAMPLE 4

Figure 11:
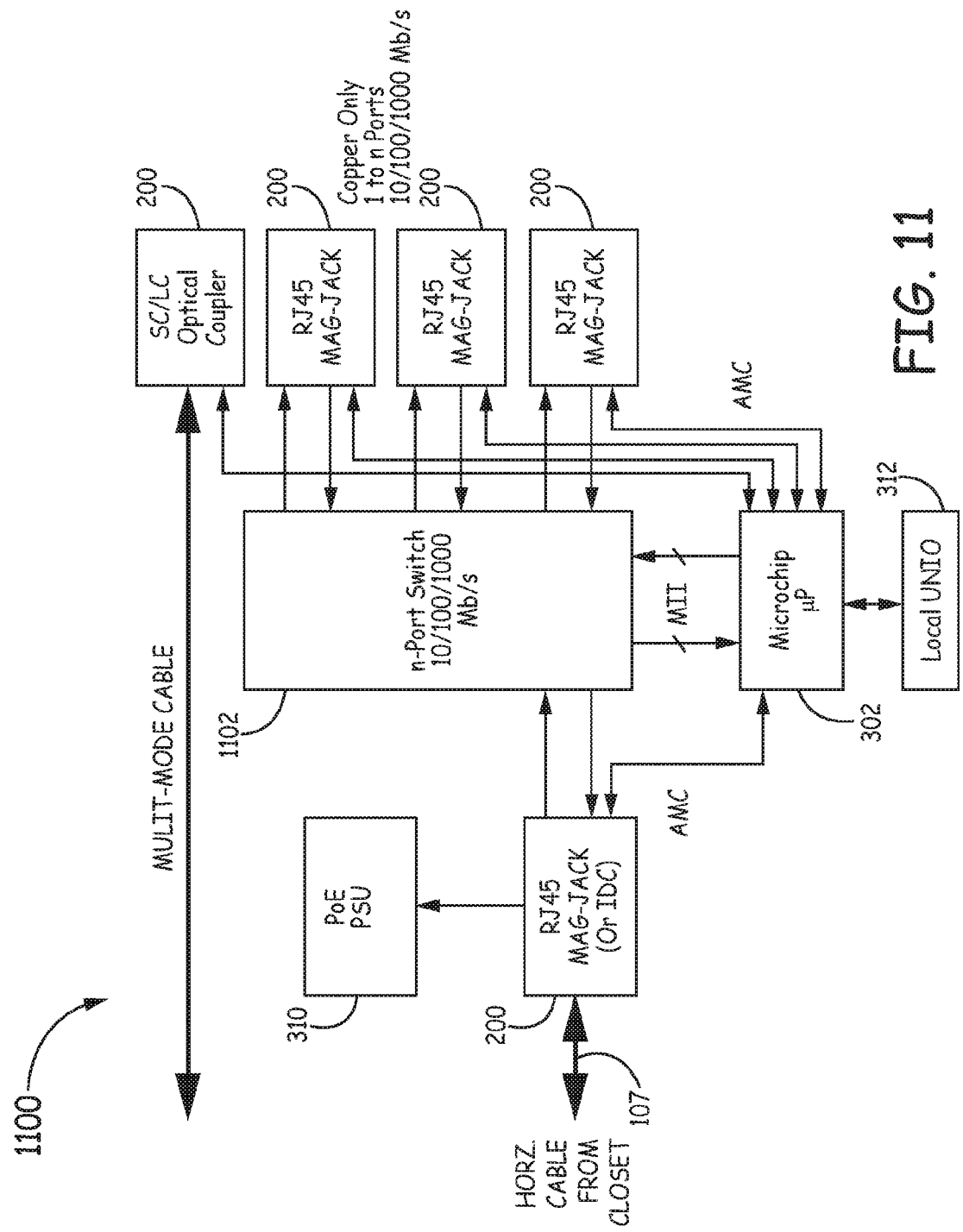
FIG. 11 is a block diagram illustrating still another embodiment of a wall outlet that is suitable for use as a wall outlet device in the system of FIG. 1.

FIG. 11 illustrates another example of a wall outlet 1100 that is suitable for use as a wall outlet 130, 150, in the system 100 of FIG. 1. The wall outlet 1100 is similar to the wall outlet 1000 except, here, a switch 1102 in the wall outlet 1100 forms a LAN that is used to connect to multiple (e.g., all) jacks 200 of the wall outlet.

Wall outlet 1100 can include one or more jacks 200 configured to mate with one or more connectors of one or more physical communication media 107. In the example shown in FIG. 11, the wall outlet 1100 includes one jack 200 for mating with an optical cable and three jacks 200 for mating with a CAT-5 or CAT-6 cable, however other numbers and types of jacks can be used. In addition to being configured to mate with a corresponding connector of a communication media 107, a first jack 200 for the optical cable terminates a horizontal run of the corresponding passive optical cable (e.g., multi-mode optical cable). The wall outlet 1100 also provides a rear jack 200 for connecting to a horizontal run of a CAT-5 or CAT-6 cable to couple the switch 1102 to a network device (e.g., patch panel 110).

The wall outlet 1100 also comprises a programmable processor 302 that is coupled to a storage device. The programmable processor 302 can include any suitable programmable processor, such as a microprocessor (e.g., an 8-bit microprocessor). The storage device can include, for example, an Electrically Erasable Programmable Read-Only Memory (EEPROM) or other non-volatile memory device. The programmable processor 302 and the storage device can be the same die, on separate dies, or can be incorporated into a chip scale package.

The programmable processor 302 can be configured to communicate with a storage device or other component in a communication media 107 connected to a jack 200 over a media reading interface 108 of the respective jack 200. The media reading interface 108, while the corresponding connector is inserted into a front connector of a jack 200, communicatively couples the programmable processor 302 to the corresponding PLM interface 216 so that the programmable processor 302 can access the storage device or other entity associated with the connector of the communication media 107.

The programmable processor 302 is configured to obtain PLM information from communication media 107 connected (mated) with jacks 200 and send the PLM information to the aggregation point 124. The programmable processor 302 can also be configured to send PLI regarding itself to the aggregation point 124 as well as receiving information from the aggregation point 124.

To implement the communications with the aggregation point 124, the programmable processor 302 can be configured to communicate with the switch 1102 within the wall outlet 1100. The switch 1102 can be coupled to the programmable processor 302 and can also be coupled to a plurality of jacks 200 for connection of physical communication media 107 to a plurality of end user devices 106 and to another jack 200 for connection of a horizontal run of physical communication media 107 to a network entity (e.g., patch panel 110). Accordingly, the switch 1102 can function to relay information between the network entity (e.g., patch panel 110, switch 160) and the end user devices 106 connected to the jacks 200. The switch 1102 can also function to relay information between the network entity (e.g., patch panel 110, switch 160) and the programmable processor 302. The programmable processor 302 can use this connection with the switch 1102 to communicate with the aggregation point 124. For example, the programmable processor 302 can communicate PLI to the switch 1102 which can provide the PLI over the network 104 to the aggregation point 124. Advantageously, this configuration enables communication between the aggregation point 124 and the programmable processor 302 to be implemented over the same communication media 107 that are used for "non-service" network traffic. Accordingly, no additional communication media 308 need be run. Moreover, this configuration can be easily retrofit into existing networks due to the lack of additional components required outside of the wall outlet 1100. The wall outlet 1100 also includes a power supply unit 310 to recover power from the communication media 107, such as, for example, by power over Ethernet (PoE) for powering of the programmable processor 302 and switch 1102. Line power can also be used as an option in non-PoE installations.

EXAMPLE 5

Figure 12:
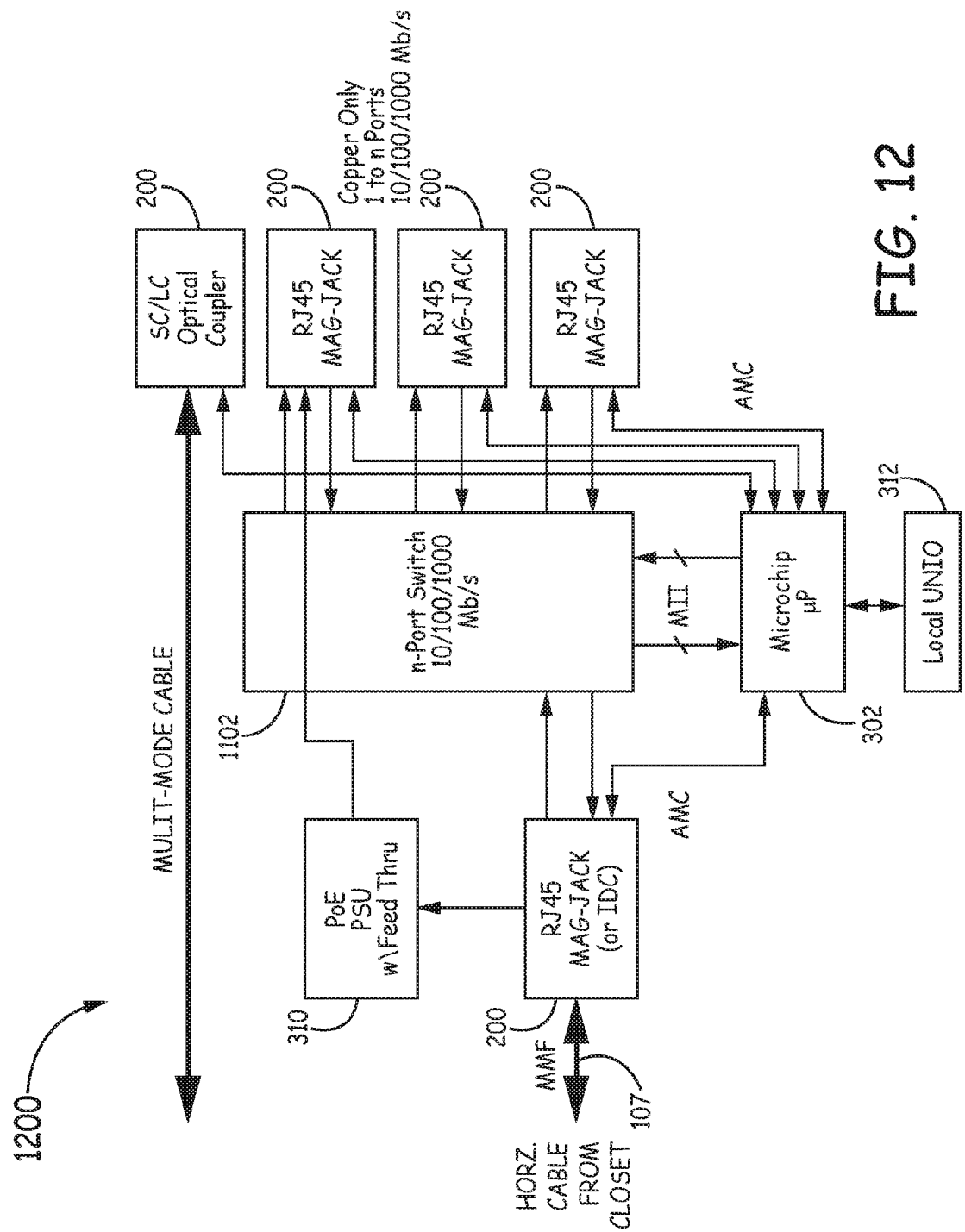
FIG. 12 is a block diagram illustrating another embodiment of a wall outlet that is suitable for use as a wall outlet device in the system of FIG. 1.

FIG. 12 illustrates another example of a wall outlet 1200 that is suitable for use as a wall outlet 130, 150, in the system of FIG. 1. The wall outlet 1200 is similar to the wall outlet 1100 except wall outlet 1200 incorporates power over Ethernet (PoE) for one or more of the jacks 200 supported by the switch 1102. Accordingly, each of the components of wall outlet 1200 functions as described with respect to wall outlet 1100. The power supply unit 310 is additionally coupled to one or more of the jacks 200 that are for coupling of communication media 107 to end user devices 106. The power supply unit 310 is configured to provide POE to the one or more jacks 200 in the wall outlet 1200. This configuration may use IEEE 802.3at-2009 PoE+(25.5 W) link over the horizontal run of the communication media 107 to enable sufficient power supply of the PoE to the wall outlet 1200. Line power can also be used as an option for some or all of the PoE provided at the jacks 200 for coupling of communication media 107 to end user devices 106.

EXAMPLE 6

Figure 13:
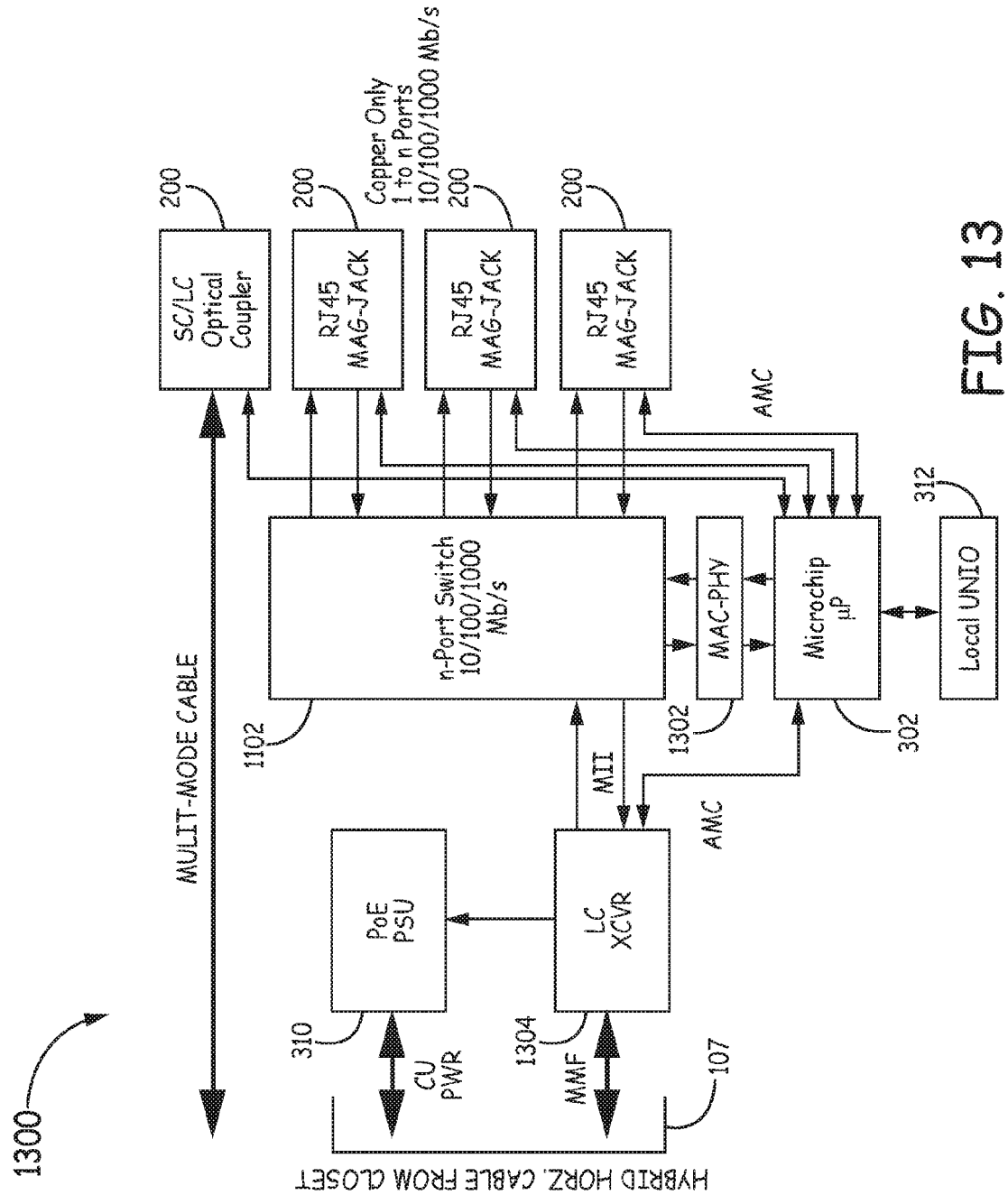
FIG. 13 is a block diagram illustrating yet another embodiment of a wall outlet that is suitable for use as a wall outlet device in the system of FIG. 1.

FIG. 13 illustrates another example of a wall outlet 1300 that is suitable for use as a wall outlet 130, 150, in the system of FIG. 1. The wall outlet 1300 is similar to the wall outlet 110 except, here, the horizontal run of the communication media 107 is a hybrid cable including both fiber optic and copper wire. Accordingly, each of the components of the wall outlet 1300 functions as described with respect to the wall outlet 1100, except in addition to or instead of sending signals over a CAT-5 or CAT-6 cable, the switch 1102 communicates with an active optical module 1304 to convert between electrical signals for the switch 1102 and optical signals on the fiber optic of the hybrid cable. The copper wire portion of the hybrid cable can be used for power over Ethernet (PoE) to power the programmable processor 302 and the switch 1102. Line power can also be used as an option for non-PoE installations.

The wall outlet 1300 also includes a media access control/physical layer (MAC/PHY) device 1302 coupled between the programmable processor 302 and the switch 1102. The MAC/PHY 1302 can translate and forward information between the programmable processor 302 and the switch 1102. The programmable processor 302 can use this connection with the MAC/PHY 1302 and switch 1102 to communicate with the aggregation point 124. For example, the programmable processor 302 can communicate PLI to the MAC/PHY 1302 which can provide the PLI to the switch 1102 which provides the PLI over the network 104 to the aggregation point 124.

EXAMPLE 7

Figure 14:
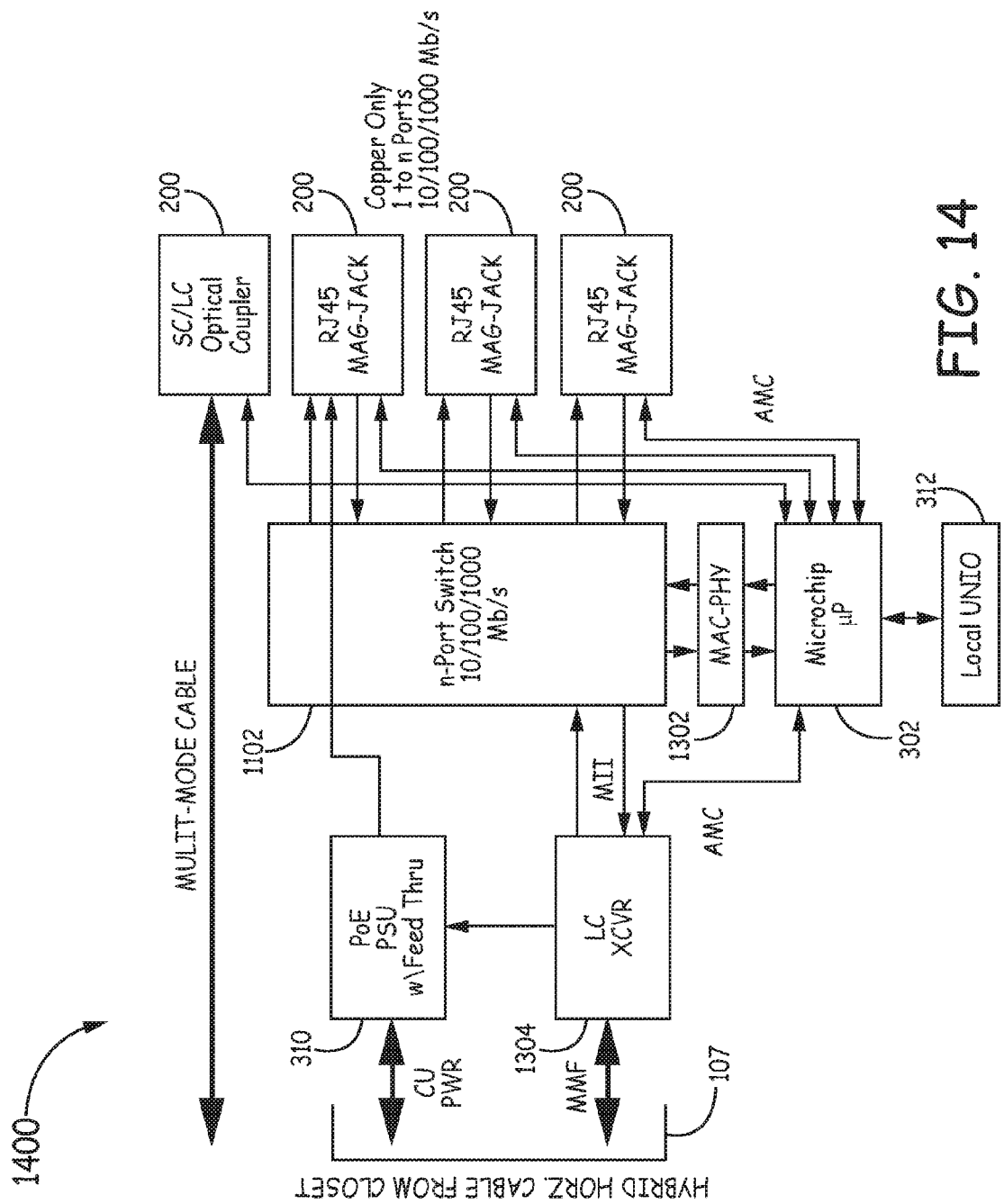
FIG. 14 is a block diagram illustrating still another embodiment of a wall outlet that is suitable for use as a wall outlet device in the system of FIG. 1.

FIG. 14 illustrates another example of a wall outlet 1400 that is suitable for use as a wall outlet 130, 150, in the system of FIG. 1. The wall outlet 1400 is similar to the wall outlet 1300 except, wall outlet 1400 incorporates power over Ethernet (PoE) for one or more of the jacks 200 supported by the switch 1102. Accordingly, each of the components of wall outlet 1400 functions as described with respect to wall outlet 1300. The power supply unit 310 is additionally coupled to one or more of the jacks 200 that are for coupling of communication media 107 to end user devices 106. The power supply unit 310 is configured to provide POE to the one or more jacks 200 in the wall outlet 1300. This configuration may use IEEE 802.3at-2009 PoE+(25.5 W) link over the horizontal run of the communication media 107 to enable sufficient power supply of the PoE to the wall outlet 1400. Line power can also be used as an option for some or all of the PoE provided at the jacks 200 for coupling of communication media 107 to end user devices 106 that is coupled to switch 1102.

Figure 15:
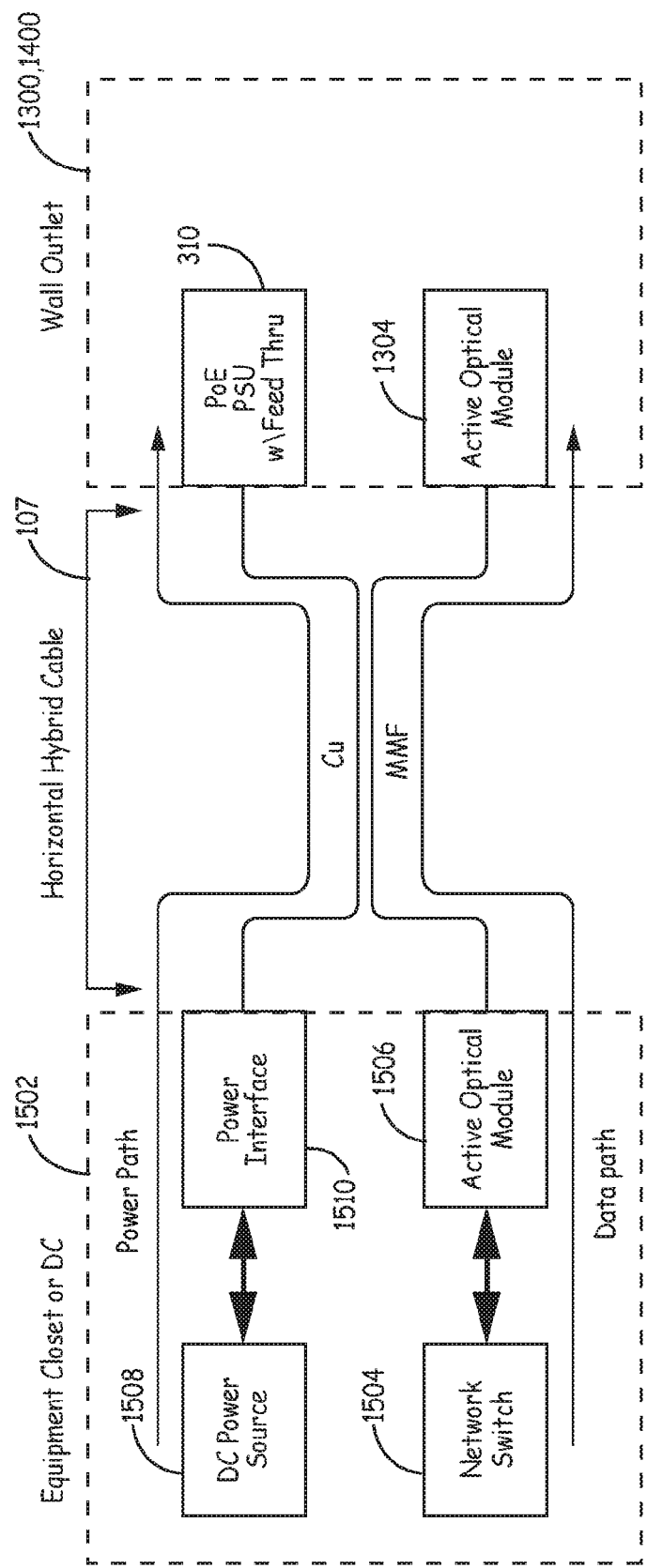
FIG. 15 is a block diagram of an example communication set-up between a network entity and a wall outlet device in the system of FIG. 1 using a hybrid cable.

FIG. 15 illustrates an example of the connection between a network device 1502 (e.g., switch 160) and a wall outlet 1300, 1400 for either of the Examples 6 or 7 using a hybrid cable 107 described with respect to FIGS. 13 and 14. As shown, a network switch 1504 can be coupled to an active optical module 1506 for communicating optical signals to/from an active optical module 1304 of the wall outlet 1300, 1400 over the optical fiber(s) of the hybrid cable 107. A DC power source 1508 can be coupled to a power interface 1510 to provide DC power (e.g., PoE) over the copper wires of the hybrid cable 107 to the power supply unit 310 of the wall outlet 1300, 1400.

EXAMPLE 8

Figure 16:
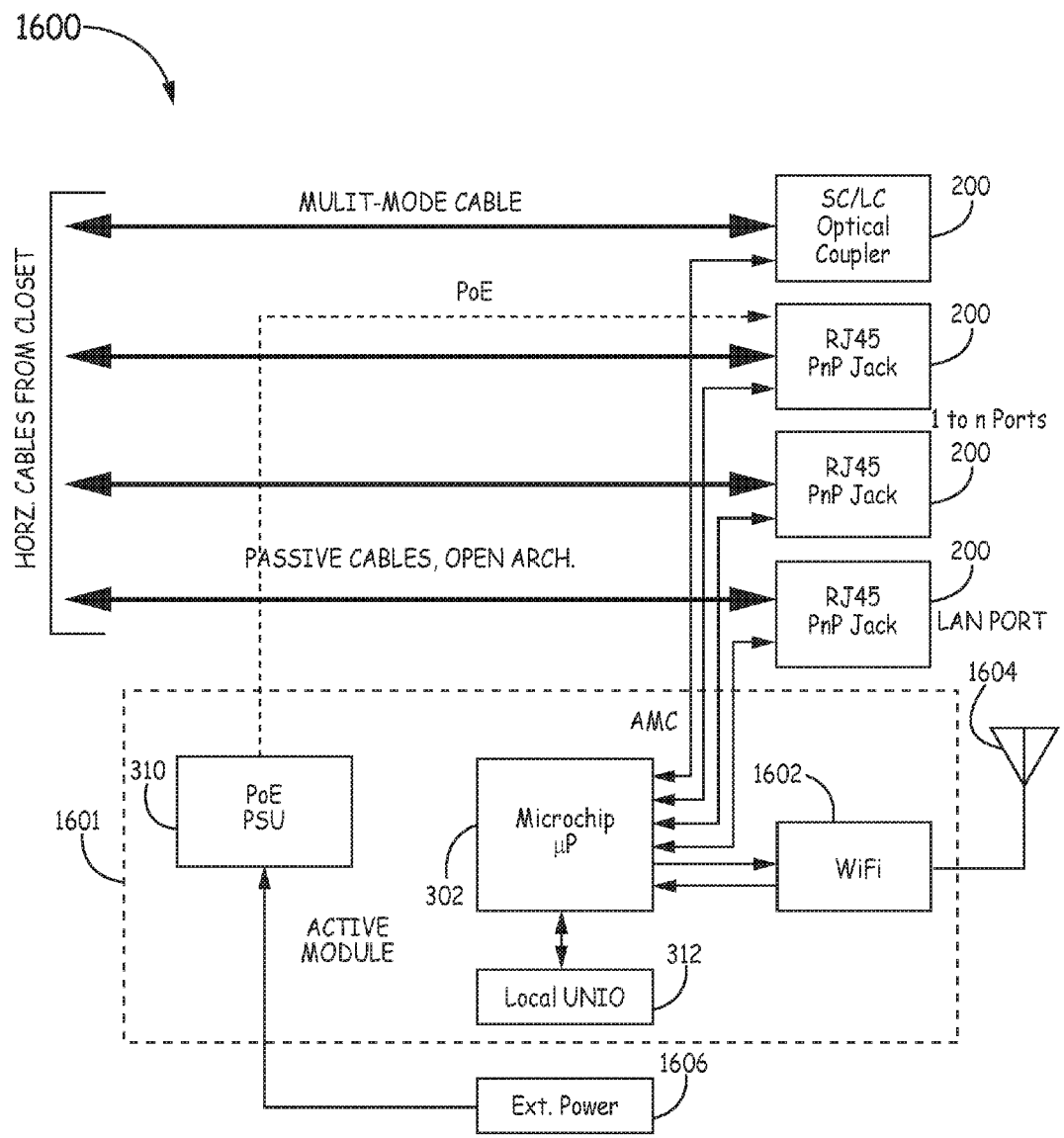
FIG. 16 is a block diagram illustrating another embodiment of a wall outlet that is suitable for use as a wall outlet device in the system of FIG. 1.

FIG. 16 illustrates another example of a wall outlet 1600 that is suitable for use as a wall outlet device 130, 150 in the system 100 of FIG. 1. Wall outlet 1600 can include one or more jacks 200 configured to mate with one or more connectors of one or more physical communication media 107. In the example shown in FIG. 16, the wall outlet 1600 includes one jack 200 for mating with an optical cable and three jacks 200 for mating with a CAT-5 or CAT-6 cable, however other numbers and types of jacks can be used. In addition to being configured to mate with a corresponding connector of a communication media 107, the wall outlet 1600 terminates a horizontal run of corresponding media 107 (e.g., multi-mode optical cable, CAT-5. CAT-6 cables) for each jack 200. In the implementation illustrated in FIG. 16, the wall outlet 1600 is a passive wall outlet 150 such that each jack 200 terminates a horizontal run of a corresponding media 107. In implementations in which wall outlet 1600 is a distribution wall outlet 130, the horizontal run of the corresponding media 107 can be terminated at a switch (not shown) in the wall outlet 1600. In the implementation shown in FIG. 16, the wall outlet 1600 terminates at least one run of a passive optical cable and at least one run of a twisted pair cable (e.g., CAT-5 or CAT-6 cable).

The wall outlet 1600 also includes an active module 1601 that comprises a programmable processor 302 that is coupled to a storage device. The programmable processor 302 can include any suitable programmable processor, such as a microprocessor (e.g., an 8-bit microprocessor). The storage device can include, for example, an Electrically Erasable Programmable Read-Only Memory (EEPROM) or other non-volatile memory device. The programmable processor 302 and the storage device can be the same die, on separate dies, or can be incorporated into a chip scale package.

The programmable processor 302 can be configured to communicate with a storage device or other component in a communication media 107 connected to a jack 200 over a media reading interface 108 of the respective jack 200. The media reading interface 108, while the corresponding connector is inserted into a front connector of a jack 200, communicatively couples the programmable processor 302 to the corresponding PLM interface 216 so that the programmable processor 302 can access the storage device or other entity associated with the connector of the communication media 107.

The programmable processor 302 is configured to obtain PLM information from communication media 107 connected (mated) with jacks 200 and send the PLM information to the aggregation point 124. The programmable processor 302 can also be configured to send PLI regarding itself to the aggregation point 124 as well as receiving information from the aggregation point 124.

To implement the communications with the aggregation point 124, the programmable processor 302 can be configured to communicate with a wireless transceiver 1602 in the active module 1601 that is coupled to an antenna 1604. The wireless transceiver 1602 can translate and forward information between the programmable processor 302 and another entity (e.g., a wireless access point) through wireless communications. The wireless transceiver can use any suitable wireless transmission protocol including, but not limited to IEEE 802.11 (WiFi), IEEE 802.14.5 (ZigBee), and Bluetooth. In an implementation of this example, the programmable processor 302 can use this connection with the wireless transceiver 1602 to communicate with the aggregation point 124. For example, the wireless transceiver 1602 can be wirelessly coupled to another device which is coupled to the network 104. Using the wireless transceiver 1602, PLI and other information can be wirelessly transmitted to/from the other device. The device can provide the PLI over the network 104 to the aggregation point 124. In some implementations of this example, the programmable processor 302 is not coupled to the aggregation point 124 in real time, and other device(s) can occasionally wirelessly couple with the wireless transceiver 1602 to obtain/provide PLI from/to the programmable processor 302. The other device(s) can then also occasionally communicatively couple to the aggregation point 124 for synchronizing of PLI.

In some examples, the other device can be another wireless transceiver 1602 in a wall outlet 1600. In one implementation of such an example, multiple wall outlets 1600 can be wirelessly coupled together (e.g., in a mesh network) to provide a communication link from remote wall outlets 1600 to more centralized wall outlets 1600 having a wired connection to network 104 or a communication link to another wireless device (e.g., wireless access point) having a wired connection to network 104. In some such implementations, the centralized wall outlets can have a communicative coupling with the aggregation point 124, thereby providing communicative coupling between the aggregation point 124 and the remote wall outlets 1600. In some such implementations, the centralized wall outlet(s) can include, in addition to including a wireless transceiver 1602 and antenna 1602, a wired communicative coupling with the network 104 and/or aggregation point 124 as described in any of the Examples 1-7 in FIGS. 1-15 above. Such centralized wall outlet(s) can forward PLI between the aggregation point 124 and the remote wall outlet(s) 1600. In this way, the remote wall outlets 1600 can be communicatively coupled to the aggregation point 124 via wireless coupling with a centralized wall outlet(s).

Advantageously, the wall outlet 1600 enables the non-service traffic from all of its ports (jacks 200) to travel on paths (e.g., communication media 107) that are distinct from the paths of the service traffic (e.g., wireless signals).

In an example, the active module 1601 includes a power supply unit 310 to obtain power from a line power source 1606. The power supply unit 310 can also optionally provide PoE to one or more of the jacks 200. In an alternative example, the power supply unit 310 can include power harvesting circuits to harvest power from wireless signals sensed by the antenna 1604. In any case, the power supply unit 310 can provide power for the programmable processor 302 and the wireless transceiver 1602. The active module 1601 can also include a local input/output port 312 such as a UNIO port.

EXAMPLE 9

Figure 17:
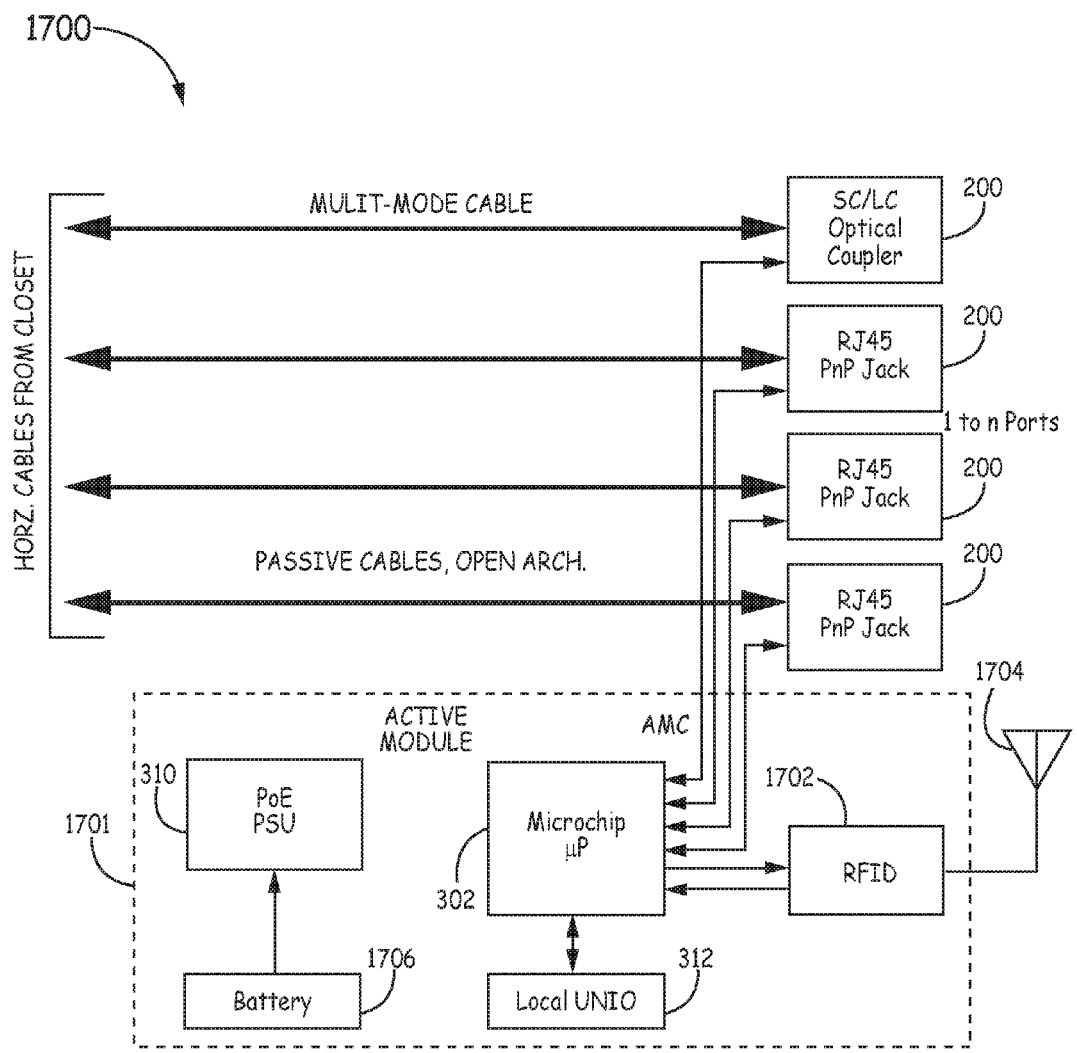
FIG. 17 is a block diagram illustrating another embodiment of a wall outlet that is suitable for use as a wall outlet device in the system of FIG. 1.

FIG. 17 illustrates another example of a wall outlet 1700 that is suitable for use as a wall outlet device 130, 150 in the system 100 of FIG. 1. Wall outlet 1700 can include one or more jacks 200 configured to mate with one or more connectors of one or more physical communication media 107. In the example shown in FIG. 17, the wall outlet 1700 includes one jack 200 for mating with an optical cable and three jacks 200 for mating with a CAT-5 or CAT-6 cable, however other numbers and types of jacks can be used. In addition to being configured to mate with a corresponding connector of a communication media 107, the wall outlet 1700 terminates a horizontal run of corresponding media 107 (e.g., multi-mode optical cable, CAT-5, CAT-6 cables) for each jack 200. In the implementation illustrated in FIG. 17, the wall outlet 1700 is a passive wall outlet 150 such that each jack 200 terminates a horizontal run of a corresponding media 107. In implementations in which wall outlet 1700 is a distribution wall outlet 130, the horizontal run of the corresponding media 107 can be terminated at a switch (not shown) in the wall outlet 1700. In the implementation shown in FIG. 17, the wall outlet 1700 terminates at least one run of a passive optical cable and at least one run of a twisted pair cable (e.g., CAT-5 or CAT-6 cable).

The wall outlet 1700 also includes an active module 1701 that comprises a programmable processor 302 that is coupled to a storage device. The programmable processor 302 can include any suitable programmable processor, such as a microprocessor (e.g., an 8-bit microprocessor). The storage device can include, for example, an Electrically Erasable Programmable Read-Only Memory (EEPROM) or other non-volatile memory device. The programmable processor 302 and the storage device can be the same die, on separate dies, or can be incorporated into a chip scale package.

The programmable processor 302 can be configured to communicate with a storage device or other component in a communication media 107 connected to a jack 200 over a media reading interface 108 of the respective jack 200. The media reading interface 108, while the corresponding connector is inserted into a front connector of a jack 200, communicatively couples the programmable processor 302 to the corresponding PLM interface 216 so that the programmable processor 302 can access the storage device or other entity associated with the connector of the communication media 107.

The programmable processor 302 is configured to obtain PLM information from communication media 107 connected (mated) with jacks 200 and send the PLM information to the aggregation point 124. The programmable processor 302 can also be configured to send PLI regarding itself to another device as well as receiving information from another device.

To implement the communications with the other device, the programmable processor 302 can be configured to communicate with a radio frequency identification (RFID) transceiver 1702 in the active module 1701 that is coupled to an antenna 1704. The programmable processor 302 can write information to the non-volatile memory (e.g., EEPROM) of the RFID transceiver 1704. When the RFID transceiver 1702 is interrogated by a RFID reader, the RFID transceiver 1702 can provide such PLI to the RFID reader. A device and/or user associated with the RFID reader may then provide such PLI to the aggregation point 124 for synchronizing of PLI. The RFID transceiver 1702 can be either an active or a passive RFID transceiver.

Advantageously, the wall outlet 1700 enables the non-service traffic from all of its ports (jacks 200) to travel on paths (e.g., communication media 107) that are distinct from the paths of the service traffic (e.g., RFID signals).

The active module 1701 also includes a power supply unit 310 to obtain power from a battery 1706 therein for powering of the programmable processor 302. In some implementations, the battery 1706 can be separate from any battery used to power (e.g., temporarily store) energy for the RFID transceiver 1702. In other implementations, the battery 1706 can also supply power to the RFID transceiver 1702 and be re-charged by the RFID transceiver 1702. In some implementations, the power supply unit 310 can include power harvesting circuits to harvest power from "non-RFID" wireless signals (as well as signals from an RFID reader interrogating the RFID transceiver 1702) sensed by the antenna 1704 to re-charge the battery 1706. The active module 1701 can also include a local input/output port 312 such as a UNIO port.

It should be understood that, in practice, wall outlet 300, wall outlet 900, wall outlet 1000, wall outlet 1100, wall outlet 1200, wall outlet 1300, wall outlet 1400, wall outlet 1600, and/or wall outlet 1700 may be used within the same network. Additionally, although not specifically shown in the Figures herein, any of the Examples described above including a rear jack 200 for mating with a connector of a horizontal run of a communication media 107, can include a media reading interface 108 in that rear jack 200 as described with respect to FIG. 2. Such media reading interface 108 can be coupled to the programmable processor 302 included in the wall outlet for obtaining and providing PLM information therefrom to the aggregation point 124 as described above.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Further details, embodiments, and implementations can be found in the following United States patent applications, all of which are hereby incorporated herein by reference:

U.S. Provisional Patent Application Ser. No. 61/124,624, filed on Feb. 13, 2009, titled "MANAGED CONNECTIVITY SYSTEMS AND METHODS" (also referred to here as the "'624 Application"); U.S. patent application Ser. No. 12/705,497, filed on Feb. 12, 2010, titled "AGGREGATION OF PHYSICAL LAYER INFORMATION RELATED TO A NETWORK" (is also referred to here as the '497 Application); U.S. patent application Ser. No. 12/705,501, filed on Feb. 12, 2010, titled "INTER-NETWORKING DEVICES FOR USE WITH PHYSICAL LAYER INFORMATION" (also referred to here as the '501 Application); U.S. patent application Ser. No. 12/705,506, filed on Feb. 12, 2010, titled "NETWORK MANAGEMENT SYSTEMS FOR USE WITH PHYSICAL LAYER INFORMATION" (also referred to here as the '506 Application); U.S. patent application Ser. No. 12/705,514, filed on Feb. 12, 2010, titled "MANAGED CONNECTIVITY DEVICES, SYSTEMS, AND METHODS" (also referred to here as the '514 Application); U.S. Provisional Patent Application Ser. No. 61/252,395, filed on Oct. 16, 2009, titled "MANAGED CONNECTIVITY IN ELECTRICAL SYSTEMS AND METHODS THEREOF" (also referred to here as the "'395 Application"); U.S. Provisional Patent Application Ser. No. 61/253,208, filed on Oct. 20, 2009, titled "ELECTRICAL PLUG FOR MANAGED CONNECTIVITY SYSTEMS" (also referred to here as the "'208 Application"); U.S. Provisional Patent Application Ser. No. 61/252,964, filed on Oct. 19, 2009, titled "ELECTRICAL PLUG FOR MANAGED CONNECTIVITY SYSTEMS" (also referred to here as the "'964 Application"); U.S. Provisional Patent Application Ser. No. 61/252,386, filed on Oct. 16, 2009, titled "MANAGED CONNECTIVITY IN FIBER OPTIC SYSTEMS AND METHODS THEREOF" (also referred to here as the "'386 Application"); U.S. Provisional Patent Application Ser. No. 61/303,961, filed on Feb. 12, 2010, titled "FIBER PLUGS AND ADAPTERS FOR MANAGED CONNECTIVITY" (the "'961 Application"); and U.S. Provisional Patent Application Ser. No. 61/303,948, filed on Feb. 12, 2010, titled "BLADED COMMUNICATIONS SYSTEM" (the "'948 Application"); U.S. Provisional Patent Application Ser. No. 61/252,964, filed on Oct. 19, 2009, titled "ELECTRICAL PLUG FOR MANAGED CONNECTIVITY", U.S. Provisional Patent Application Ser. No. 61/253,208, filed on Oct. 20, 2009, titled "ELECTRICAL PLUG FOR MANAGED CONNECTIVITY", U.S. patent application Ser. No. 12/907,724, filed on Oct. 19, 2010, titled "MANAGED ELECTRICAL CONNECTIVITY SYSTEMS", U.S. Provisional Patent Application Ser. No. 61/303,948, filed on Feb. 12, 2010, titled "PANEL INCLUDING BLADE FEATURE FOR MANAGED CONNECTIVITY", U.S. Provisional Patent Application Ser. No. 61/413,844, filed on Nov. 15, 2010, titled "COMMUNICATIONS BLADED PANEL SYSTEMS", U.S. Provisional Patent Application Ser. No. 61/439,693, filed on Feb. 4, 2011, titled "COMMUNICATIONS BLADED PANEL SYSTEMS", U.S. patent application Ser. No. 13/025,730, filed on Feb. 11, 2011, titled "COMMUNICATIONS BLADED PANEL SYSTEMS", U.S. patent application Ser. No. 13/025,737, filed on Feb. 11, 2011, titled "COMMUNICATIONS BLADED PANEL SYSTEMS", U.S. patent application Ser. No. 13/025,743, filed on Feb. 11, 2011, titled "COMMUNICATIONS BLADED PANEL SYSTEMS", U.S. patent application Ser. No. 13/025,750, filed on Feb. 11, 2011, titled "COMMUNICATIONS BLADED PANEL SYSTEMS", U.S. Provisional Patent Application Ser. No. 61/303,961; filed on Feb. 12, 2010, titled "Fiber Plug And Adapter For Managed Connectivity", U.S. Provisional Patent Application Ser. No. 61/413,828, filed on Nov. 15, 2010, titled "Fiber Plugs And Adapters For Managed Connectivity", U.S. Provisional Patent Application Ser. No. 61/437,504, filed on Jan. 28, 2011, titled "Fiber Plugs And Adapters For Managed Connectivity", U.S. patent application Ser. No. 13/025,784, filed on Feb. 11, 2011, titled "Managed Fiber Connectivity Systems", U.S. patent application Ser. No. 13/025,788, filed on Feb. 11, 2011, titled "Managed Fiber Connectivity Systems", U.S. patent application Ser. No. 13/025,797, filed on Feb. 11, 2011, titled "Managed Fiber Connectivity Systems", U.S. patent application Ser. No. 13/025,841, filed on Feb. 11, 2011, titled "Managed Fiber Connectivity Systems", U.S. Provisional Patent Application Ser. No. 61/413,856, filed on Nov. 15, 2010, titled "CABLE MANAGEMENT IN RACK SYSTEMS", U.S. Provisional Patent Application Ser. No. 61/466,696, filed on Mar. 23, 2011, titled "CABLE MANAGEMENT IN RACK SYSTEMS", U.S. Provisional Patent Application Ser. No. 61/252,395, filed on Oct. 16, 2009, titled "MANAGED CONNECTIVITY IN ELECTRICAL SYSTEMS", U.S. patent application Ser. No. 12/905,689, filed on Oct. 15, 2010, titled "MANAGED CONNECTIVITY IN ELECTRICAL SYSTEMS", U.S. Provisional Patent Application Ser. No. 61/252,386, filed on Oct. 16, 2009, titled "MANAGED CONNECTIVITY IN FIBER OPTIC SYSTEMS", U.S. patent application Ser. No. 12/905,658, filed on Oct. 15, 2010, titled "MANAGED CONNECTIVITY IN FIBER OPTIC SYSTEMS", U.S. Provisional Patent Application Ser. No. 61/467,715, filed on Mar. 25, 2011, titled "DOUBLE-BUFFER INSERTION COUNT STORED IN A DEVICE ATTACHED TO A PHYSICAL LAYER MEDIUM", U.S. Provisional Patent Application Ser. No. 61/467,725, filed on Mar. 25, 2011, titled "DYNAMICALLY DETECTING A DEFECTIVE CONNECTOR AT A JACK", U.S. Provisional Patent Application Ser. No. 61/467,729, filed on Mar. 25, 2011, titled "IDENTIFIER ENCODING SCHEME FOR USE WITH MULTI-PATH CONNECTORS", U.S. Provisional Patent Application Ser. No. 61/467,736, filed on Mar. 25, 2011, titled "SYSTEMS AND METHODS FOR UTILIZING VARIABLE LENGTH DATA FIELD STORAGE SCHEMES ON PHYSICAL COMMUNICATION MEDIA SEGMENTS", and U.S. Provisional Patent Application Ser. No. 61/467,743, filed on Mar. 25, 2011, titled "EVENT-MONITORING IN A SYSTEM FOR AUTOMATICALLY OBTAINING AND MANAGING PHYSICAL LAYER INFORMATION USING A RELIABLE PACKET-BASED COMMUNICATION PROTOCOL".

What is claimed is:

1. A wall plate device comprising:
   a plurality of jacks, each jack including a rear attachment point configured to couple to one or more communication paths for non-service network traffic, each jack including a front attachment point configured to mate with a connector of a corresponding cable and couple such cable to the one or more communication paths at the rear attachment point, each jack including a media reading interface configured to interface with a physical layer management (PLM) interface of a connector connected to the front attachment point;
   a programmable processor coupled to each of the media reading interfaces through a path other than the one or more communication paths for non-service network traffic and configured to access a storage device or other component of a connector through the media reading interface to obtain PLM information, the programmable processor configured to communicate the PLM information to a host server, wherein the connector is connected to the front attachment point.

2. The wall plate device of claim 1, comprising:
   a signaling circuit coupled to the programmable processor and configured to transmit and receive signals over a second cable coupled thereto, the second cable distinct from any horizontal runs of communication media used for non-service network traffic, wherein the programmable processor is configured to communicate PLM information over the second cable to the host server.

3. The wall plate device of claim 2, wherein the programmable processor is configured to operate as a slave processor to a master processor in the host server.

4. The wall plate device of claim 2, comprising:
   a power supply unit configured to recover DC power from the second cable for powering of the programmable processor and the signaling circuit.

5. The wall plate device of claim 1, comprising:
   a network switch coupled to at least one of the jacks in the plurality of jacks and to a horizontal run of cable, the network switch configured to relay non-service network traffic between the horizontal run and the at least one of the jacks;
   wherein the programmable processor is coupled to the network switch and configured to send the PLM information to the network switch such that the network switch can communicate the PLM information over the horizontal run of cable along with the non-service network traffic.

6. The wall plate device of claim 5, comprising:
   a power supply unit configured to recover power from the horizontal run of communication media using a power-over-Ethernet (PoE) protocol, the power supply unit configured to provide such power to the programmable processor and the network switch.

7. The wall plate device of claim 1, comprising:
   a MAC/PHY translation circuit coupled to the programmable processor and configured to transmit and receive signals over a CAT-5 or CAT-6 cable coupled thereto, the CAT-5 or CAT-6 cable distinct from any horizontal runs of cable used for non-service network traffic, wherein the programmable processor is configured to communicate PLM information over the CAT-5 or CAT-6 cable to an aggregation point.

8. The wall plate device of claim 1, comprising:
   a wireless transceiver coupled to the programmable processor, wherein the programmable processor is configured to communicate PLM information over a wireless link through the wireless transceiver.

9. The wall plate device of claim 1, comprising:
   a radio frequency identification (RFID) transceiver including a non-volatile memory coupled to the programmable processor, wherein the programmable processor is configured to store the PLM information in the non-volatile memory such that the RFID transceiver communicates the PLM information when interrogated by an RFID reader.

10. A system for physical layer management, the system comprising:
an aggregation point;
a plurality of wall outlet devices communicatively coupled to the aggregation point through an IP network, each of the plurality of wall outlet devices including a plurality of jacks, each jack including a rear attachment point configured to couple to one or more communication paths for non-service network traffic, each jack including a front attachment point configured to mate with a connector of a corresponding cable and couple such cable to the one or more communication paths at the rear attachment point, each jack including a media reading interface configured to interface with a physical layer management (PLM) interface of a connector connected to the front attachment point;
a programmable processor coupled to each of the media reading interfaces through a path other than the one or more communication paths for non-service network traffic and configured to access a storage device or other component through the media reading interface to obtain PLM information, the programmable processor configured to communicate the PLM information to the aggregation point over the IP network wherein the connector is connected to the front attachment point; and
a host server coupled to the plurality of wall outlet devices and to the IP network using a plurality of second cables, the plurality of second cables distinct from any horizontal runs of cable used for non-service network traffic.

11. The system of claim 10, wherein each of the plurality of wall outlet devices includes a signaling circuit coupled to the programmable processor and configured to transmit and receive signals with the host server over a respective second cable, wherein the programmable processor is configured to communicate PLM information to the host server and the host server is configured to communicate the PLM information to the aggregation point over the IP network.

12. The system of claim 10, wherein the programmable processor of each of the plurality of wall outlet devices is configured to operate as a slave processor to a master processor in the host server.

13. The system of claim 10, wherein each of the plurality of wall outlet devices includes:
a power supply unit configured to recover DC power from the respective second cable for powering of the programmable processor and the signaling circuit.

14. The system of claim 10, wherein at least one of the plurality of wall outlet devices includes:
a network switch coupled to at least one of the jacks and to a horizontal run of cable that is coupled to the IP network, the network switch configured to relay non-service network traffic between the horizontal run and the at least one of the jacks;
wherein the programmable processor of the at least one wall outlet device is coupled to the network switch and configured to send the PLM information to the network switch such that the network switch can communicate the PLM information over the horizontal run of cable along with the non-service network traffic.

15. The system of claim 14, wherein the at least one wall outlet device includes:
a power supply unit configured to recover power from the horizontal run of cable using a power-over-Ethernet (PoE) protocol, the power supply unit configured to provide such power to the programmable processor and the network switch.

16. The system of claim 10, wherein at least one of the plurality of wall outlet devices include:
a MAC/PHY translation circuit coupled to the programmable processor and configured to transmit and receive signals over a CAT-5 or CAT-6 cable coupled thereto, the CAT-5 or CAT-6 cable distinct from any horizontal runs of cable used for non-service network traffic, wherein the CAT-5 or CAT-6 cable and the horizontal runs of cable are coupled to the IP network; wherein the programmable processor is configured to communicate PLM information over the CAT-5 or CAT-6 cable to an aggregation point.

17. The system of claim 10, wherein each of the plurality of wall outlet devices include:
a wireless transceiver coupled to the programmable processor, wherein the wireless transceivers of the plurality of wall outlet devices are coupled together in a mesh network, wherein the programmable processor of each of the plurality of wall outlet devices is configured to communicate PLM information over a wireless link through the wireless transceiver.

18. A method of physical layer management, the method comprising:
accessing, through a plurality of media reading interface of a plurality of jacks, a plurality of storage devices associated with connectors for a cable while the connectors are connected to the plurality of jacks to obtain PLM information from the plurality of storage devices, wherein the plurality of jacks are in at least one wall plate device and the accessing is by a programmable processor in the wall plate device, wherein each jack in the plurality of jacks is configured to couple to one or more communication paths for non-service network traffic and the programmable processor is coupled to the plurality of media reading interfaces through a path other than the one or more communication paths for non-service network traffic; and
communicating the PLM information from the wall plate device to an aggregation point, wherein the communicating includes transmitting and receiving signals over a second cable with a host device, wherein the host device communicates with the aggregation point.

19. The method of claim 18, comprising:
sending instructions from the host device to a plurality of wall plate devices, instructing the plurality of wall plate devices to obtain PLM information from cable connected to jacks of the plurality of wall plate devices.

20. The method of claim 18, wherein communicating the PLM information includes:
sending the PLM information from the programmable processor to a network switch in the wall plate device; and
sending the PLM information from the network switch over a horizontal run of cable to the aggregation point via an IP network;
wherein the method further includes sending non-service traffic corresponding to the jack from the network switch to the IP network over the horizontal run of cable.

* * * * *